April 18, 1961 F. V. BOOKOUT ET AL 2,980,224

COIN ACTUATED OPERATING MECHANISM FOR VENDING MACHINES

Filed Dec. 4, 1957 8 Sheets-Sheet 1

INVENTORS.
Floyd Vest Bookout
Theodore Lewis Hanson
Donald Wallace McBride
BY [signature]
ATTORNEY.

COIN ACTUATED OPERATING MECHANISM FOR VENDING MACHINES

Filed Dec. 4, 1957 8 Sheets-Sheet 2

INVENTORS.
Floyd Vest Bookout
Theodore Lewis Hanson
Donald Wallace McBride
BY [signature]
ATTORNEY

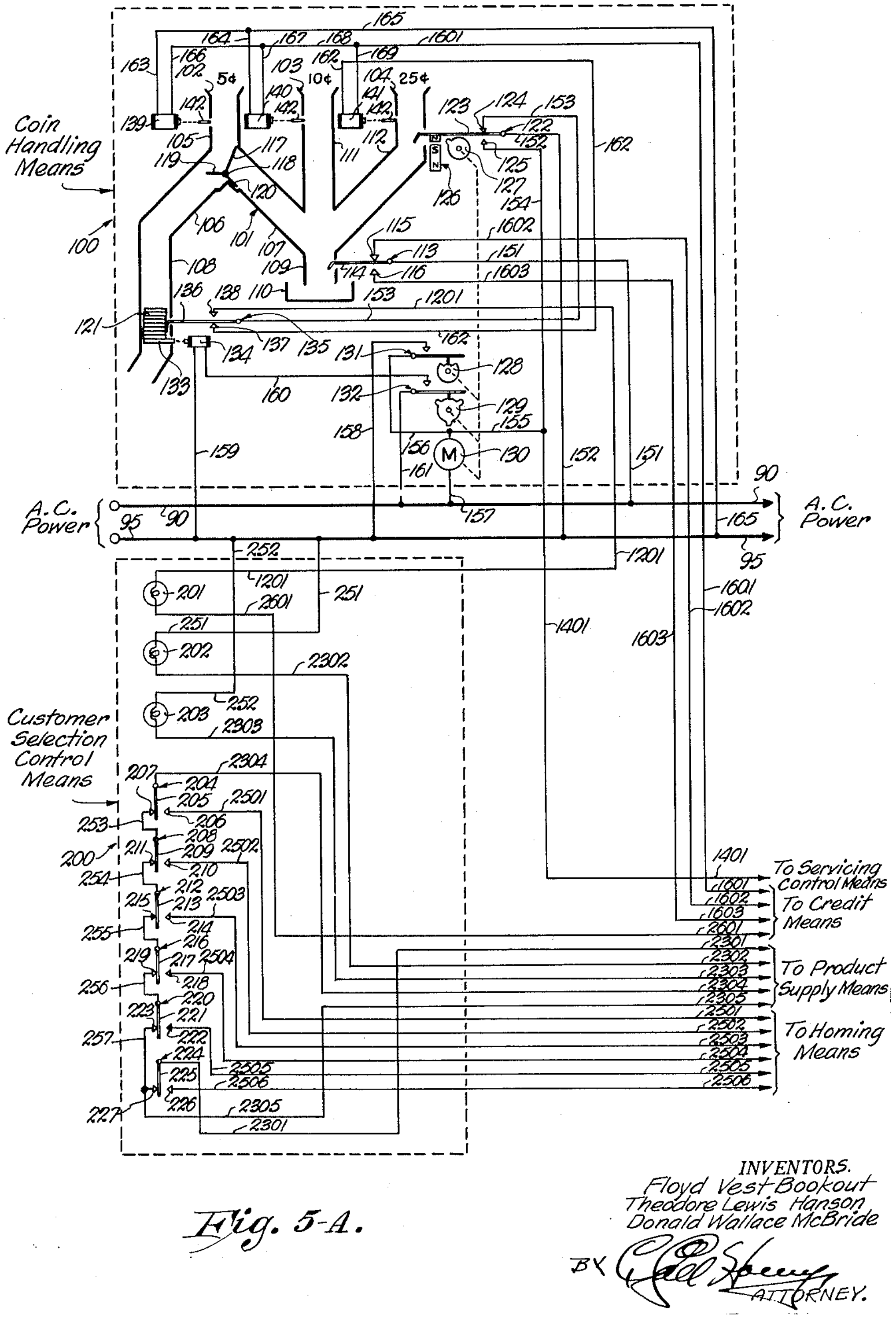
Fig. 5-A.
INVENTORS.
Floyd Vest Bookout
Theodore Lewis Hanson
Donald Wallace McBride
BY [signature]
ATTORNEY.

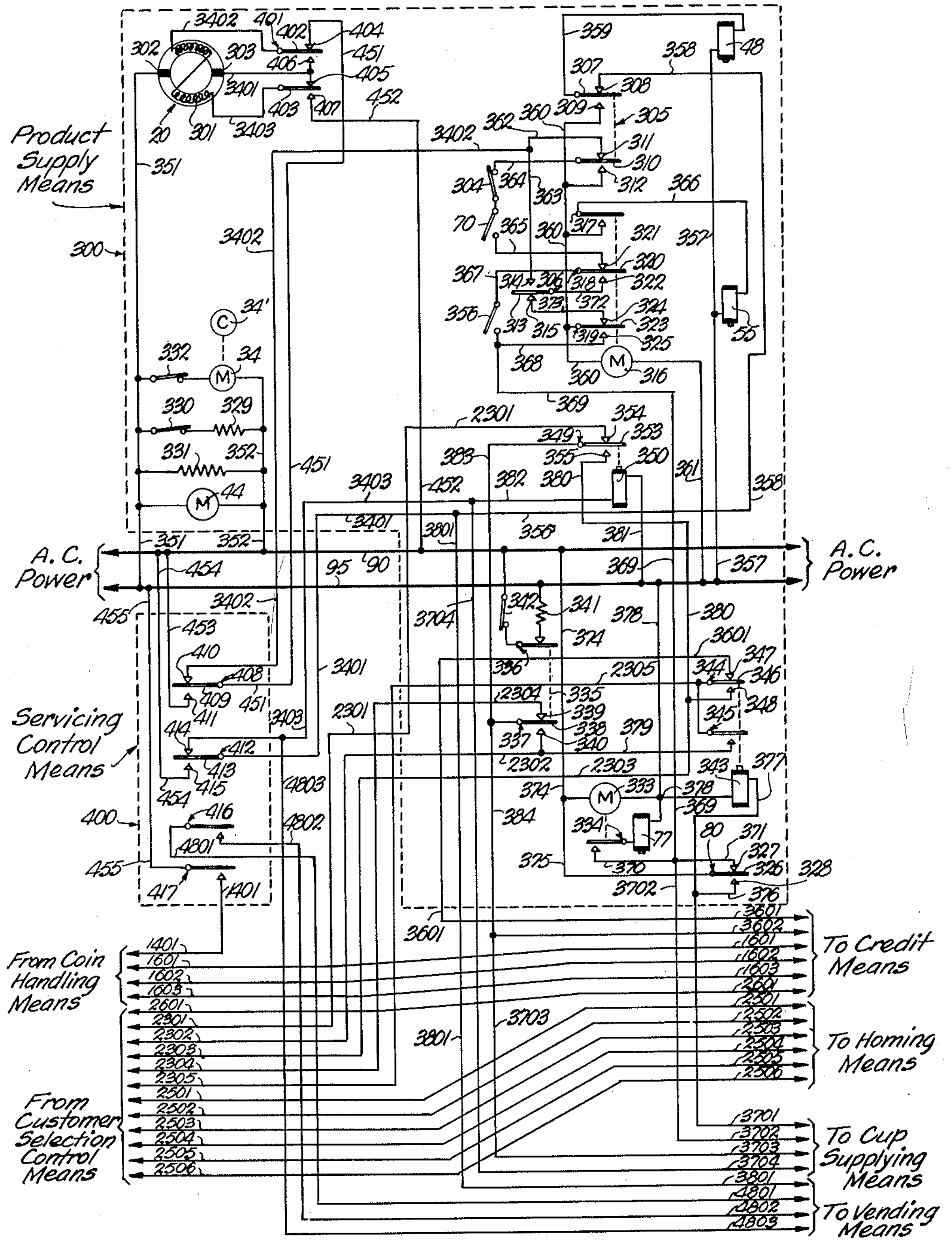
Fig. 5-B.
INVENTORS.
Floyd Vest Bookout
Theodore Lewis Hanson
Donald Wallace McBride
BY
ATTORNEY.

April 18, 1961 F. V. BOOKOUT ET AL 2,980,224
COIN ACTUATED OPERATING MECHANISM FOR VENDING MACHINES
Filed Dec. 4, 1957 8 Sheets-Sheet 5
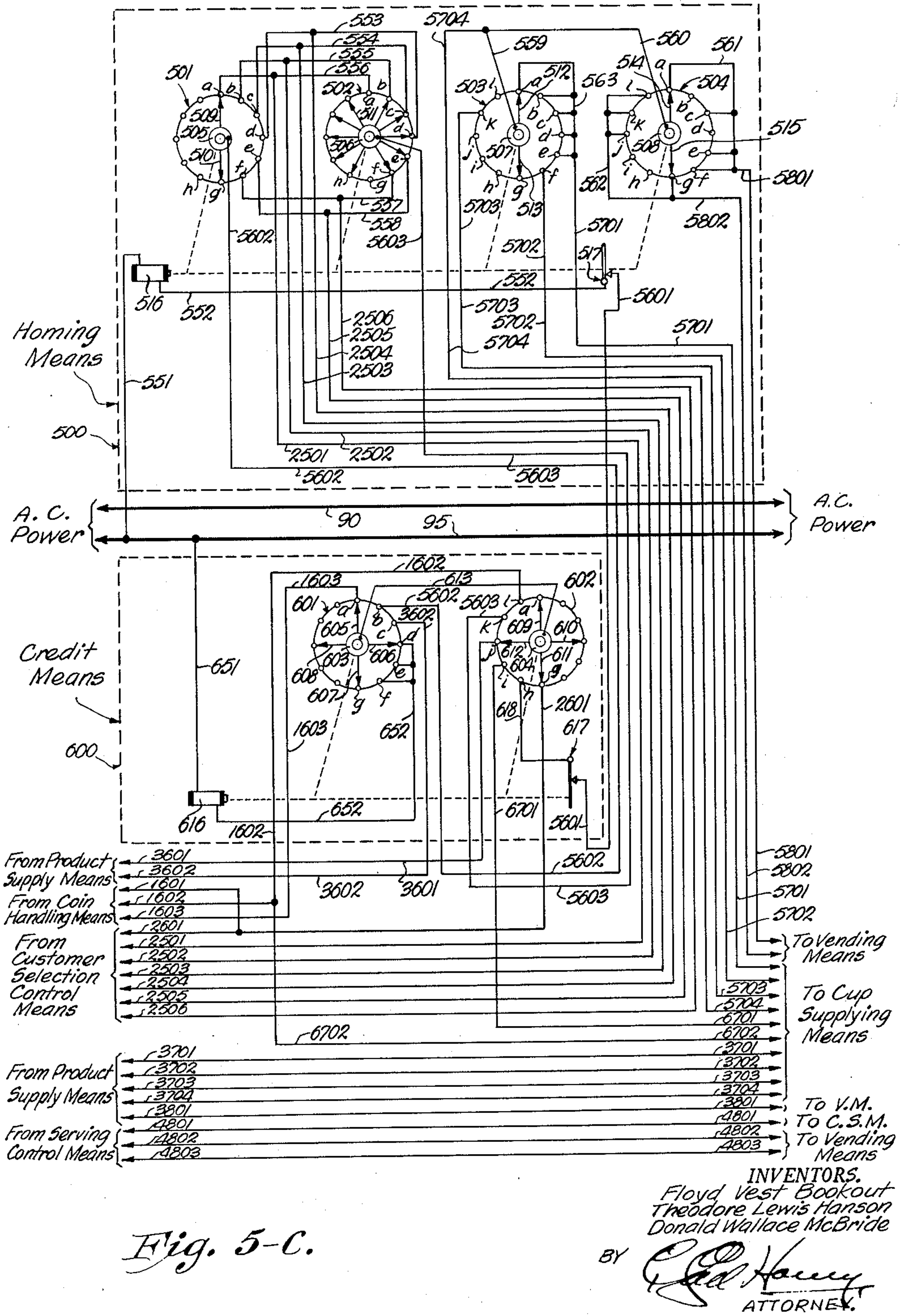
Fig. 5-C.
INVENTORS.
Floyd Vest Bookout
Theodore Lewis Hanson
Donald Wallace McBride
BY [signature]
ATTORNEY.

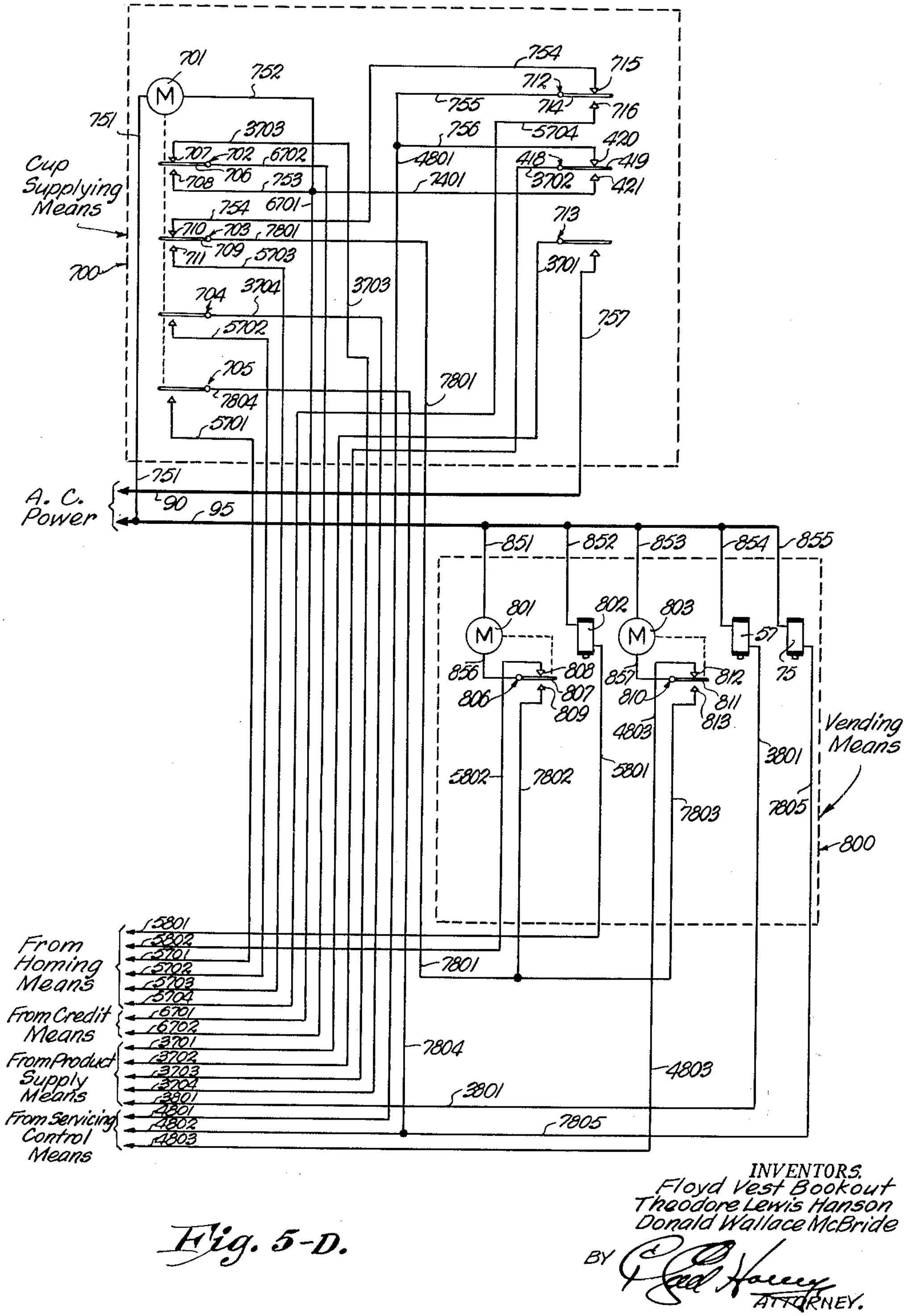
Fig. 5-D.
INVENTORS.
Floyd Vest Bookout
Theodore Lewis Hanson
Donald Wallace McBride
BY [signature]
ATTORNEY.

COIN ACTUATED OPERATING MECHANISM FOR VENDING MACHINES

Filed Dec. 4, 1957 8 Sheets-Sheet 7

INVENTORS.
Floyd Vest Bookout
Theodore Lewis Hanson
Donald Wallace McBride
BY Carl Hoppe
ATTORNEY.

April 18, 1961 F. V. BOOKOUT ET AL 2,980,224

COIN ACTUATED OPERATING MECHANISM FOR VENDING MACHINES

Filed Dec. 4, 1957 8 Sheets-Sheet 8

INVENTORS.
Floyd Vest Bookout
Theodore Lewis Hanson
BY Donald Wallace McBride
BY [signature]
ATTORNEY.

United States Patent Office 2,980,224

Patented Apr. 18, 1961

2,980,224

COIN ACTUATED OPERATING MECHANISM FOR VENDING MACHINES

Floyd Vest Bookout, Independence, Theodore Lewis Hanson, Kansas City, and Donald Wallace McBride, Independence, Mo., assignors to The Vendo Company, Kansas City, Mo., a corporation of Missouri Filed Dec. 4, 1957, Ser. No. 700,606

22 Claims. (Cl. 194—13)

This invention relates generally to the field of coin actuated vending machines and more particularly to improved mechanism for operating such a machine to vend a selected one of a plurality of products responsive to the deposit of coinage and the making of a product selection by the customer.

The invention further relates to operating mechanism for vending machines of the "post-select" type, rather than to vending machines of the "pre-select" type, although certain of the improvements and features contemplated by the invention are applicable to either of such types of machines. Post-select vending machines are ones in which the customer makes his product selection after depositing the necessary coinage, while pre-select vending machines are ones in which the customer must make his product selection prior to depositing the necessary coinage and in which either the customer or the mechanism must provide for maintenance of the selection indication during deposit of the coinage. Post-select vending machines enjoy a number of advantages over pre-select type vending machines. For example, post-select operation permits product selection by the customer by means of devices such as push-button switches, which have a normally unactuated condition and need be actuated only momentarily after the deposit of coinage, while with pre-select operation, either normally unactuated devices must be maintained in actuated condition by the customer during the deposit of coinage or product selection devices which have two static conditions must be used, thereby creating a danger that an undesired product will be vended to the customer if a product selection device has been left in actuated condition and the customer fails to make a new and proper selection before depositing his coinage. Another example is that, with pre-select operation, internal parts of the operating mechanism of the machine may be subjected to undue wear through manipulation of product selection devices by persons not intending to make any purchase, since in this type of machine, portions of the internal operating mechanism must normally be adapted for operation prior to the deposit of any coinage. Other advantages of post-select operation over pre-select operation will be apparent to those skilled in the art from the description of the present invention which follows.

Prior attempts to provide satisfactory operating mechanism for plural product, post-select vending machines have all been unsuccessful and have produced only arrangements which are subject to various disadvantages, in many instances greater than those encountered with pre-select operation. Some of such attempts to provide post-select operating mechanism have involved arrangements so complex as to be entirely uneconomical, while others have involved the use of components whose nature or multiplicity rendered the apparatus unreliable, impractical or unduly vulnerable to the effects of wear from ordinary operation. Still other such prior attempts at providing post-select operating mechanism have been limited as to the nature or number of operating functions of the vending machine which could be properly sequenced or otherwise controlled thereby.

It is, therefore, the broad, primary object of this invention to provide practical, reliable, economical and versatile operating mechanism particularly adapted for use in a plural product, post-select vending machine, which will automatically control all of the operations required to take place within the machine in order to vend to the customer a selected product responsive only to his deposit of adequate coinage and his momentary manipulation thereafter of a product selection device.

It is another important object of the invention to provide such operating mechanism which is adapted for controlling the preparation of selected products from stored materials, as well as the actual vending of the selected product.

Another important object of the invention is the provision of operating mechanism for plural product, post-select vending machines which is of nature fully integrating the various sub-assemblies included in the machine for proper and reliable, coordinated operation.

Another important object of the invention is to provide operating mechanism for vending machines including as an important component thereof an improved form of solenoid-operated, ratchet-type, rotary switching apparatus of advantageous nature and novel construction by which the electrical circuitry aspects of the operating mechanism can be simplified and a number of other components of such mechanism eliminated.

It is another important object of the invention to provide operating mechanism for a post-select, plural product vending machine characterized by a novel and advantageous combination of a minimum number of components arranged in cooperating relationship.

It is a further object of the invention to provide operating mechanism for such vending machines which include means for controlling the operation of a cup dispenser in a manner coordinated with the operation of the product dispensing apparatus.

It is still another important object of the invention to provide operating mechanism for vending machines adapted for the vending of bulk liquids which includes the provision of means accessible to a service man by which he may control the operation of the vending machine operating mechanism during cleaning operations and the like without the necessity of depositing any coinage.

Still other significant objects of the invention will be made clear or become apparent to those skilled in the art from the description of an illustrative, preferred embodiment of the invention that follows. It is to be understood, and will be apparent, that the invention and various portions thereof have wide applicability to various types of vending machines. In order to illustrate the application of the invention to one such type of machine, however, the accompanying drawings and following description have been directed to the disclosure and explanation of the invention as it is applicable to a post-select, hot drink vending machine adapted to prepare and dispense either hot chocolate, black coffee, coffee with sugar only, coffee with sugar and cream, coffee with cream only, or coffee with cream and a double measure of sugar. It will be obvious to those skilled in the art that the operating mechanism contemplated by the invention can be adapted without departure from the principles thereof to machines for preparing and serving entirely different products, a different number of products or, by elimination of the corresponding components of the mechanism, products which are fully prepared and ready for vending prior to storage in the machine.

Figure 6:
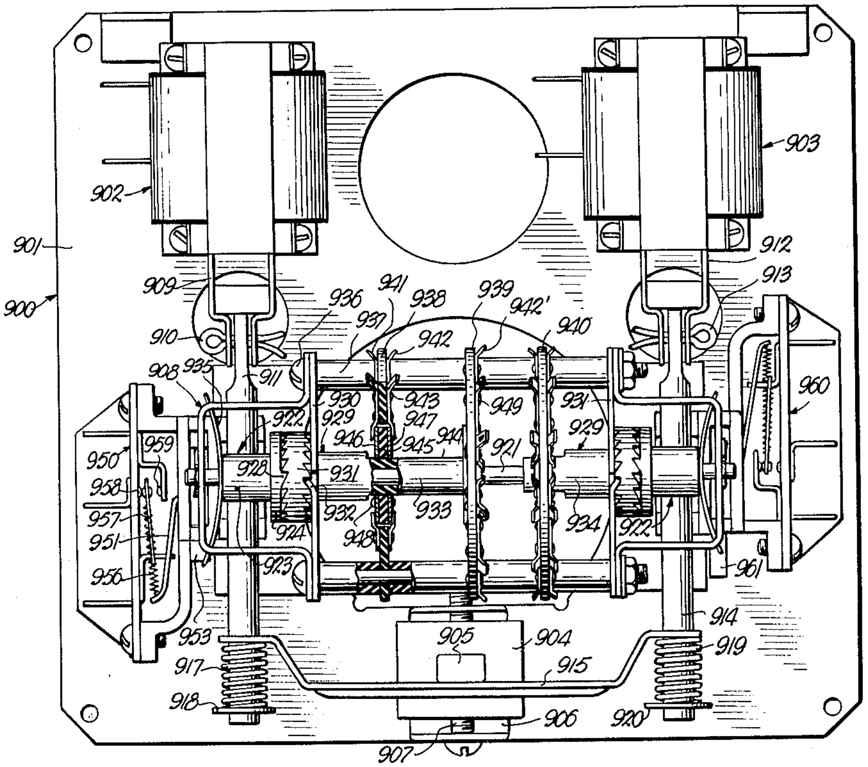
Figures 7, 8:
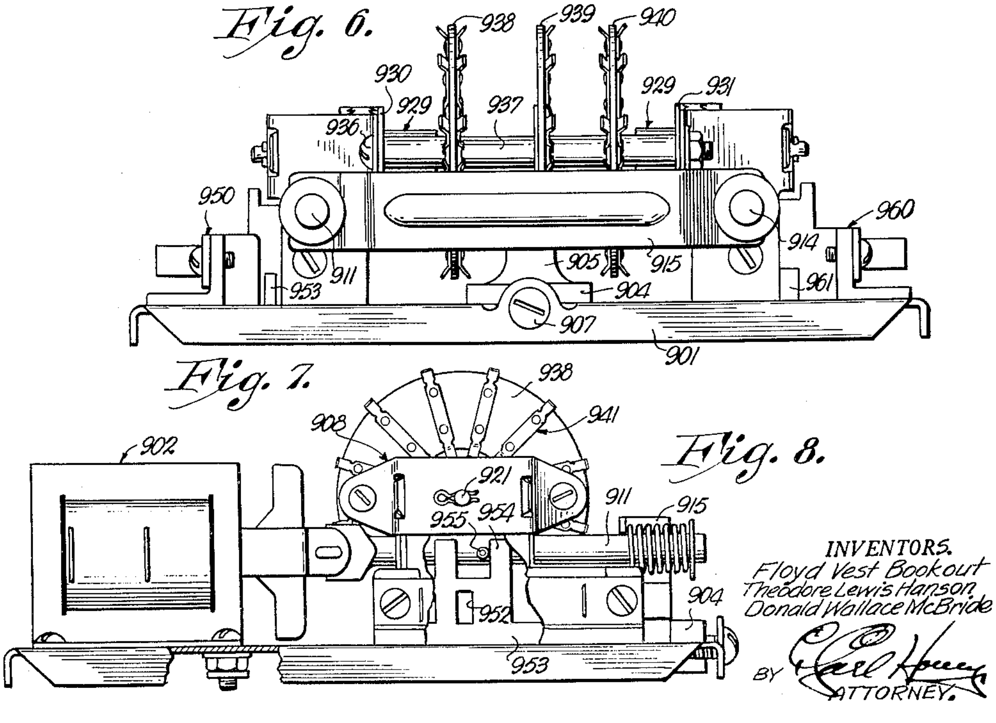
Figures 9, 10, 11:
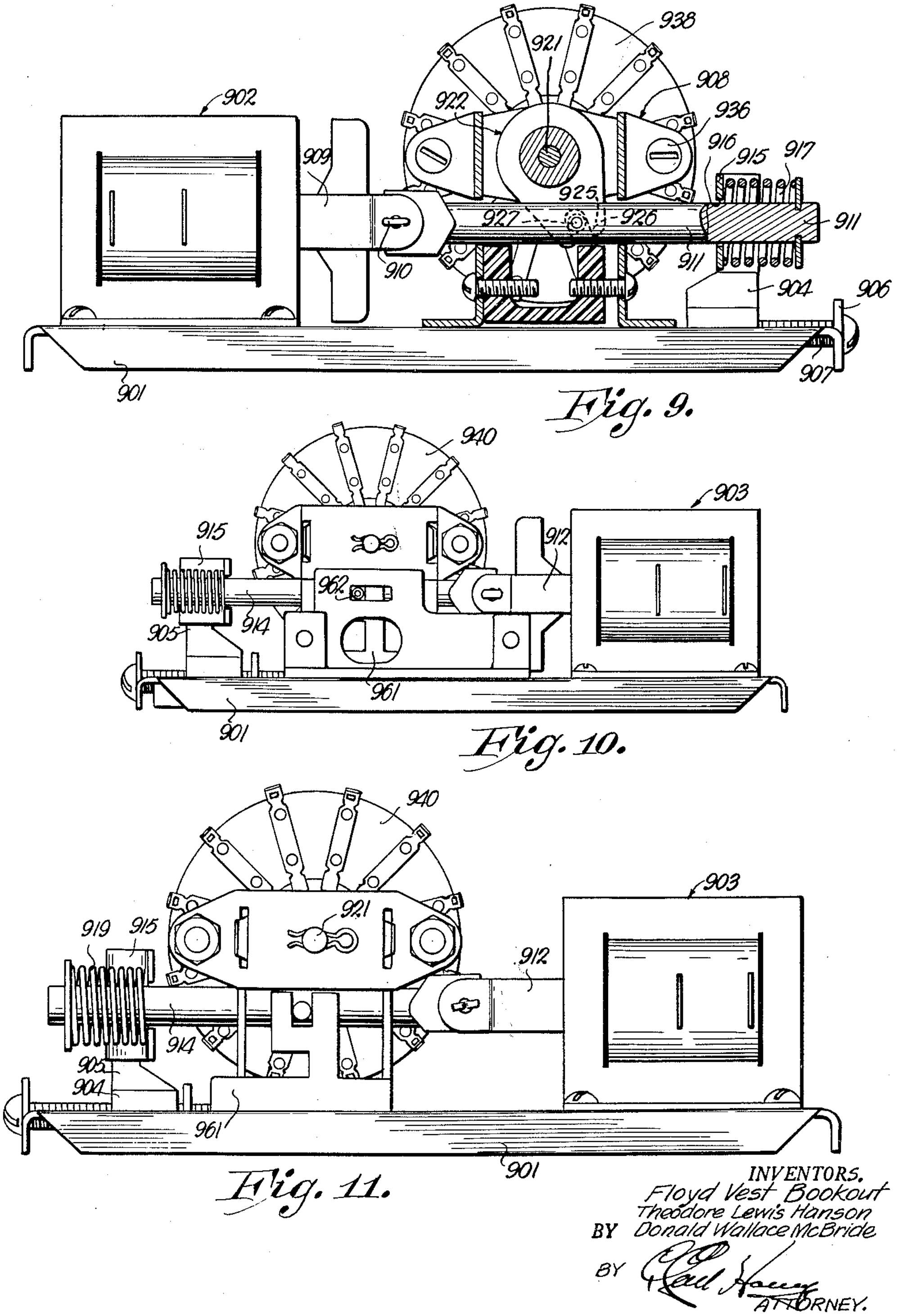

Figures 5–A, 5–B, 5–C and 5–D together, constitute a schematic diagram of the electrical portions of the operating mechanism contemplated by the invention, with certain mechanical and electro-mechanical components also being shown to illustrate the relationship thereof to the electrical operating mechanism;

Figure 6 is a top plan view of the improved, solenoid-operated, ratchet-type, switching apparatus, contemplated by the invention and forming an important part of the preferred form of vending machine operating mechanism contemplated by the invention;

Figure 7 is an end elevational view of the switching apparatus shown in Figure 6;

Figure 8 is a side elevational view of the switching apparatus shown in Figure 6 taken from the lefthand side thereof as viewed in Figure 6, and with parts thereof broken away to show a reciprocating member for operating an auxiliary switch;

Figure 9 is a side elevational view similar to Figure 8 with additional parts broken away and shown in cross section to better reveal further portions of the ratchet switch operating means;

Figure 10 is a side elevational view of the apparatus shown in Figure 6 taken from the right-hand side thereof as viewed in Figure 6; and Figure 11 is a side elevational view similar to Figure 10 with parts broken away to show a member used for operating an auxiliary switch.

PHYSICAL ARRANGEMENT OF SUB-ASSEMBLIES

Figures 1, 2:
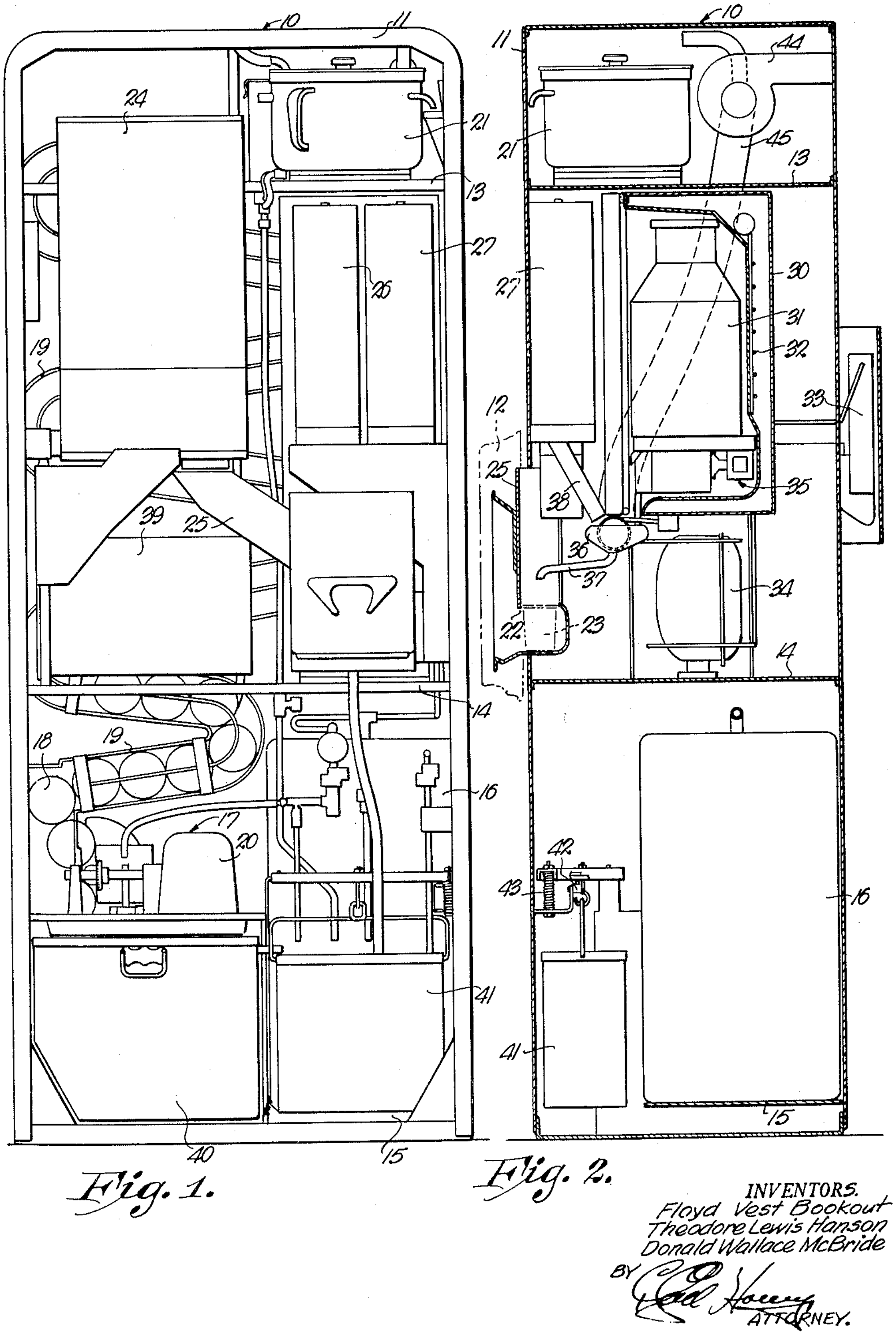
Figure 1 is a front elevational view of a hot drink vending machine with the front door removed to display the interior arrangement thereof.
Figure 2 is a side elevational view of the vending machine shown in Figure 1 with the side of the housing appearing at the right side of Figure 1 broken away to display the interior of the machine.

Figures 1 and 2 are intended to identify and indicate a preferred physical arrangement for certain of the major sub-assemblies included in the form of vending machine chosen for description to illustrate the principles of the invention. Referring to these figures the vending machine is generally designated by the numeral 10.

Vending machine 10 is enclosed within a housing 11 which will normally be provided with a swingable front access door as at 12 in Figure 2. Suitable brackets and internal sub-frames such as at 13, 14 and 15 are provided for supporting in any suitable manner the various sub-assemblies to be described.

Such sub-assemblies include a hot water tank 16 adapted to be coupled with a water main and other parts of the machine 10 by conduit means better illustrated in Figure 3, it being understood that no attempt is made in Figures 1 and 2 to show all of the hydraulic and electrical connections which are included in the machine 10 and are illustrated and specifically described in connection with figures later to be considered.

The machine 10 further includes a coffee brewing unit 17, which is preferably of the type adapted to successively pierce cans 18 containing coffee grounds fed to the brewing unit from a storage rack 19 and to pass hot water therethrough to brew fresh coffee by an infusion process, such brewing unit 17 including its own operating motor 20. From the brewing unit 17 coffee is passed to a coffee blender and reservoir unit 21 which will be further described hereinafter.

The housing 11 is provided with a customer access opening 22 through which the customer may withdraw hot beverage dispensed by the machine 10 into a cup 23. The numeral 24 identifies a cup storing and supplying unit, which may be of various commercially available forms adapted to successively dispense paper cups from a bulk supply thereof, such cups being routed by means such as a chute 25 to the product-receiving position illustrated by the cup 23 in Figure 2. As will later be explained, the cup dispensing apparatus 24 is provided with its own, self-contained operating motor with which are associated certain timed sequencing switches and certain other electrical switches also to be later described are preferably provided as a part of unit 24. A dry ingredient dispenser for hot chocolate power is identified by the numeral 26, while a similar dry ingredient dispenser for sugar is identified by the numeral 27, each of such dispensers 26 and 27 being provided with their own electrical operating motors 28 and 29 respectively as illustrated in Figure 3.

Dry ingredient dispensers 26 and 27 are preferably mounted on a hinged bracket for swinging movement during servicing of the machine 10 to a position permitting access to a chamber 30 in which is stored a cream-containing receptacle 31. The chamber 30 is kept refrigerated by an evaporator 32 associated with a conventional refrigeration system also including a condenser 33 and a motor-driven compressor 34. Cream may be dispensed from container 32 by solenoid-operated means generally designated 35 in measured amount into a funnel-like mixing bowl 36 having a spout 37 disposed for discharging materials received therein into a cup 23 at the vending position. It may be noted that the dry ingredient dispensers 26 and 27 are also provided with spouts such as 38 for discharging into the mixing bowl 36 and that suitable conduit means are also provided for discharging coffee from the receptacle 21 into the mixing bowl 36.

The electrical control components of the machine 10 are located within a housing 39 and will be hereinafter individually described. A container 40 is provided to receive empty cans 18 discharged by the coffee brewing unit 17, and a shiftably mounted waste-receiving tank 41 is disposed to receive waste fluids from various portions of the machine 10 and to operate an electrical switch as at 42 when the weight of waste liquids within the tank 42 overcomes the yieldable bias of a spring 43 to an extent indicating that the tank 41 has been filled to a degree that reception of further fluids would cause overflow. A blower 44 having a hose connection 45 may be provided to exhaust vapors from the interior of the housing 11 and particularly the zone of the latter adjacent the mixing bowl 36 into which hot liquids are discharged.

Mechanism for receiving the deposit of coinage, making change and responding electrically to the deposit of adequate coinage, will normally be provided within the door 12 of the machine 10 at any location convenient to the customer and such coin-responsive mechanism may be of various commercial forms, although an illustrative, preferred form of such mechanism adapted for use with the particular machine 10 being described, is shown and explained in connection with Figure 5–A. It may also be noted that product selection buttons and certain indicating lights accessible to the customer will normally be provided on the door 12, such product selection devices and indicating devices being shown and more fully described in connection with Figure 5–A.

HYDRAULIC RELATIONSHIPS

Figure 3:
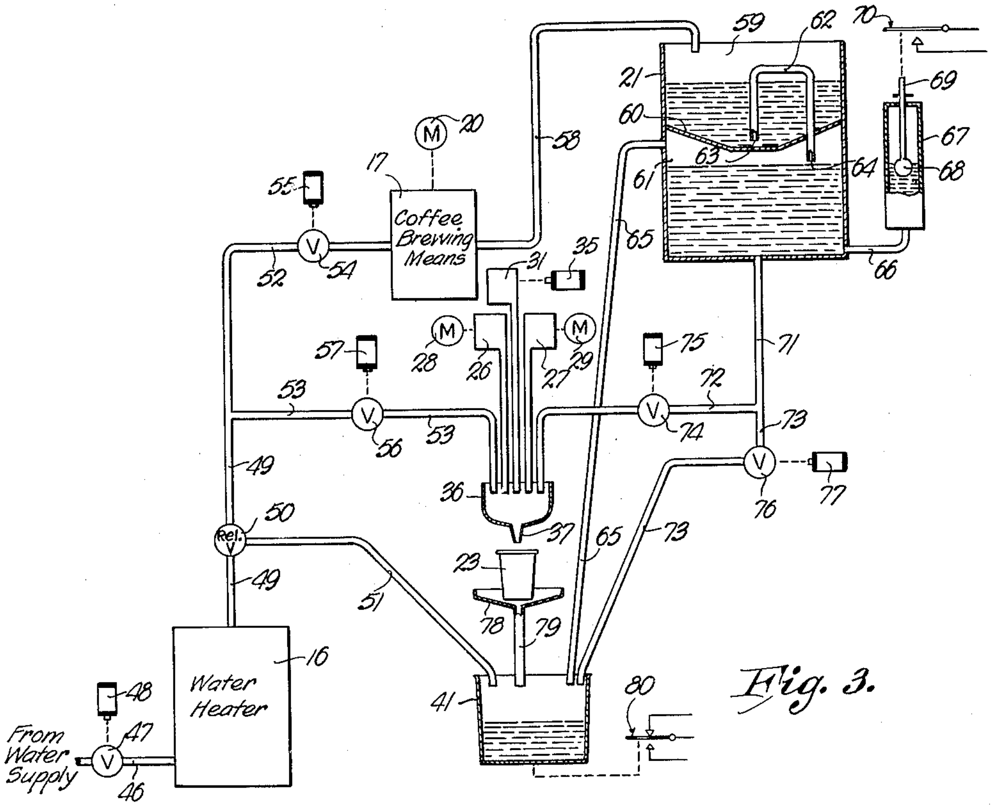
Figure 3 is a schematic diagram illustrating the flow relationships between the principal hydraulic and related components of the machine.

Referring now to Figure 3, the primary hydraulic relationships and other paths of product material flow in the form of machine chosen for illustrating the invention are shown. The water heater 16, which is provided with electrical heating means to be later identified and discussed in connection with Figure 5-B, has coupled thereto a water input conduit 46 which is in turn adapted for coupling to a water main or other source of water supply under pressure. Interposed in water input conduit 46 is a main water control valve 47 adapted to be operated by a solenoid 48. A water output conduit 49 is oppositely coupled with the water heater 16 and has a pressure relief valve 50 interposed therein. Pressure relief valve 50 has a drain-off pipe 51 associated therewith and leading to a point of discharge into the waste tank 41. On the side of the pressure relief valve 50 opposite the water heater 16, the water output conduit 49 divides into two branches identified by the numerals 52 and 53. Branch 52 leads to the coffee-brewing means 17 which is electrically operable by a motor 20, such branch 52 having a brew water control valve 54 adapted to be operated by a solenoid 55 interposed therein. Branch 53 leads to a point of discharge into the mixing bowl 36 and has interposed therein a chocolate preparing water control valve 56 adapted to be operated by a solenoid 57.

A coffee output conduit 58 is coupled with the coffee brewing means 17 and leads to a point for discharging into an upper chamber 59 of the coffee reservoir 21 for discharging freshly brewed coffee from the coffee brewing means 17 into such upper mixing chamber 59. Reservoir 21 is provided with an intermediate partition 60 defining the bottom of compartment 59 and the top of a coffee storage compartment 61. A siphon 62 has its input end 63 within the mixing compartment 59 adjacent the bottom thereof, and its discharge end 64 within the storage compartment 61 adjacent the top thereof, it being understood that the uppermost stretch or bight of the siphon 62 is so disposed within the mixing chamber 59 to permit an accumulation in the latter of a predetermined quantity of freshly brewed coffee before discharging the contents of the mixing chamber 59 into the storage chamber 61 by siphon action.

Mixing chamber 61 is provided with an overflow pipe 65 communicating therewith adjacent its top and leading to a point to discharge into the waste tank 41. Also connected with the storage chamber 61 adjacent the bottom thereof is a conduit 66 leading to a float chamber 67 in which is shiftably disposed a suitable float 68 having an element 69 connected thereto which is operably coupled with an electrical switch generally designated 70 whose identity and purpose will be hereinafter more fully described.

A coffee outlet conduit 71 is connected with the coffee storage chamber 61 adjacent the bottom thereof and divides into two branches 72 and 73. Branch 72 of coffee outlet conduit 71 leads to a point of discharge into the mixing bowl 36 and has interposed therein a coffee dispensing valve 74 adapted to be operated by a solenoid 75. Branch 73 of coffee outlet conduit 71 leads to a point of discharge into the waste tank 41 and has interposed therein a coffee dump valve 76 adapted to be operated by a solenoid 77 when it is desired to empty the coffee storage chamber 61 during servicing of the machine 10.

The hot chocolate powder dispenser 26, the sugar dispenser 27 and the cream dispensing receptacle 31 are all disposed to discharge into the mixing bowl 36 upon actuation of their corresponding operating structures 28, 29 and 35 respectively, each of which is arranged to measure out a predetermined quantity of the corresponding product material upon each actuation thereof.

A funnel-like cup supporting stand 78 is provided for supporting a cup 23 beneath the spout 37 of the mixing bowl 36 for receiving product materials from the latter, such stand 78 having a drain conduit 79 leading to a point for discharging any materials spilled or overflow from the cup 23 into the waste tank 41. A waste tank switch generally designated 80 is associated with the waste tank 41 for operation when the latter becomes filled with waste material to a predetermined level and, like the switch 70, its purpose and function will be hereinafter more fully explained.

It will be understood that the pressure relief valve normally permits flow of hot water therethrough within the hot water output conduit 49 and acts to discharge hot water through the drain pipe 51 into the waste tank only in the event of an excessive pressure, or if desired temperature being developed in the water within water heater 16 and the portion of conduit 49 leading to the relief valve 50. It will also be understood that the main water valve 47, the chocolate preparing water valve 56, the coffee brew water valve 54, the coffee dump valve 76 and the coffee dispensing valve 74 are all normally closed but are adapted to be opened in control fashion by the operating mechanism of the invention including and associated with their respective operating solenoids.

It will thus far be clear, however, that by operating the solenoids 48, 57 and 35 and the motors 28 and 29 for predetermined periods of time where appropriate, all of the ingredients for making hot chocolate, namely, hot water, hot chocolate powder, cream, and sugar, may be discharged into the mixing bowl 36 for delivery through the spout 37 into a cup 23 on the stand 78. Similarly, it will be clear that upon actuation of the solenoids 48 and 55, and the motor 20, the infusion-type coffee brewing means 17 may be operated with the attendant passage of hot water through the coffee within cans 18 to supply freshly brewed coffee to the mixing chamber 59 of coffee reservoir 21. Finally, it will be clear that upon actuation of the solenoid 75, the coffee dispensing valve 54 will be operated to dispense coffee through the mixing bowl 36 and spout 37 thereof into a cup 23 on the stand 78. It is the mechanism for controlling these and certain other associated functions that constitutes the broad, primary structure contemplated by the invention and more fully described hereinafter.

FUNCTIONAL UNITS AND PRINCIPAL CONTROL RELATIONSHIPS THEREBETWEEN

Figure 4:
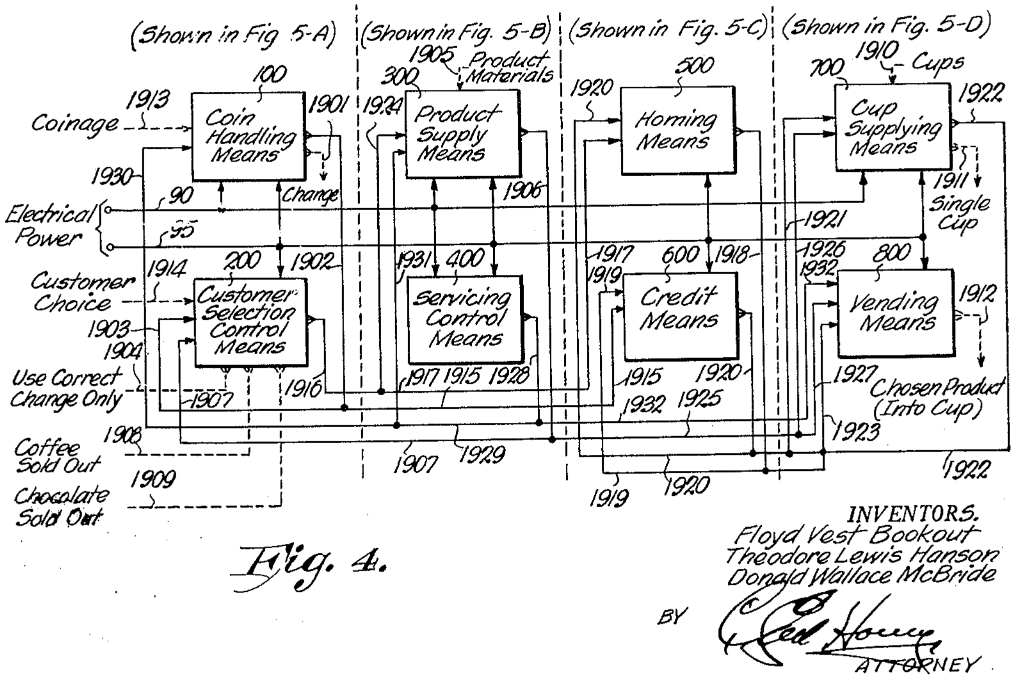
Figure 4 is a block diagram illustrating the principal sub-assemblies used in the machine and the control relationships therebetween effected by the operating mechanism contemplated by the invention.

Referring now to Figure 4, there is illustrated schematically the various functional units of which the vending machine 10 is comprised, together with the principal paths and directions of flow of control data between such units. In general, the paths of control data flow between such units corresponds to the electrical interconnections between such units effected by the operating mechanism contemplated by the invention.

The main functional units of the vending machine 10 will be seen from Figure 4 to include coin handling means 100, customer selection control means 200, product supply means 300, servicing control means 400, homing means 500, credit means 600, cup supplying means 700, and vending means 800, each of which is more fully illustrated as to detail in a corresponding portion of Figure 5 and will be more fully described in connection with the latter. The two sides of an electrical power line are respectively designated 90 and 95, the former being connected with the coin handling means 100, the product supply means 300, the servicing control means 400, and the cup supplying means 700, while the latter is connected with the coin handling means 100, the customer selection control means 200, the product supply means 300, the servicing control means 400, the homing means 500, the credit means 600, the cup supplying means 700 and the vending means 800.

As will be apparent from Figure 4, product materials are periodically introduced to the product supply means 300 and paper cups in bulk are periodically introduced into the cup supplying means 700 during servicing of the machine.

A résumé of the more important flow paths of control function and commodity inputs and outputs to, from and between the various means 100, 200, 300, 400, 500, 600, 700 and 800 of the machine 10, as a prelude to more detailed description of the nature and manner of coordinated operation of such means, will make consideration of such detailed description more convenient.

Machine 10 is capable of giving to the potential customer, by appropriate indications emanating from the customer selection control means 200, any of three control function outputs. First, whenever the coin handling means 100 (which is normally capable of accepting any of various denominations of coinage and returning change to the customer as indicated at 1901) has exhausted its supply of change-making coins, it produces a control function output which is carried along path 1902, 1903 and delivered as an input to the customer selection control means 200, the latter in turn responding to such input to produce a control function output by way of a "use correct change only" indication to potential customers as at 1904. Second and third, whenever the product supply means 300 has exhausted its supply of particular product materials (which are periodically replenished in the product supply means 300 during servicing of machine 10, as indicated at 1905), the product supply means produces a corresponding control function output which is carried, as indicated by lines 1906 and 1907 in Figure 4, to the customer selection control means 200, the latter in turn responding to such input to produce a corresponding control function output by way of a "coffee sold out" indication or a "chocolate sold out" indication to potential customers as at 1908 and 1909 respectively. It may also be noted that a secondary control function output of cup supplying means 700 not specifically represented in Figure 4 is fed to the customer selection control means 200 whenever the supply of cups, which are periodically replenished during servicing of the machine 10 as indicated at 1910, is exhausted, such input to customer selection control means 200 resulting in the latter simultaneously producing both of the "sold out" indications 1908 and 1909.

In addition to the mentioned, normally operative, change-returning output, the machine 10 has two primary commodity outputs, both of which are delivered to the customer. First, the cup supplying means 700 dispenses, during each vending cycle of the machine 10, a single paper cup or the like, as indicated at 1911. Second, the vending means 800 dispenses, during each vending cycle of the machine 10, a measured quantity of the chosen beverage product as indicated at 1912. It is obvious, since the beverage output 1912 is delivered into cup output 1911, that such outputs must be so sequenced that cup output 1911 precedes beverage output 1912.

Machine 10 has, besides the product material input 1905 (which may be understood to include the normally continuous supply of water to product supply means 300, as by conduit 46 in Figure 3), the cup supply input 1910 and the electrical power input represented by power lines 90 and 95, two primary inputs, both of which are control function inputs introduced to machine 10 by the customer. The first of these is the deposit by the customer of adequate coinage into the coin handling means 100, as indicated at 1913; and the second is the indication given by the customer to the customer selection control means 200 regarding the particular product he desires for the machine 10 to vend, such latter input being accomplished by momentary manipulation by the customer of a selection button or the like on means 200 as generally represented at 1914 and hereinafter more fully explained. In the preferred embodiment of the invention, the coinage deposit input 1913 must precede the product selection input 1914 for the latter to be effective. (It may also be noted that secondary control function outputs of cup supplying means 700 and product supply means 300 not specifically represented in Figure 4 are fed to the coin handling means 100 for effecting physical blocking of the coinage deposit input path 1913 when the machine 10 is rendered incapable of vending any product as at 1912 by virtue of the exhaustion of cups, product materials needed for vending every end product or the like, the coin handling means 100 similarly producing an intra-unit control function output illustrated only in Figure 5 for effecting physical blockage of the coinage deposit input path 1913 for coins of certain denominations when the exhaustion of change-making coins in the coin handling means 100 has rendered the latter incapable of making change as at 1901.)

The remaining control function paths illustrated in Figure 4 relate mainly to the manner in which the operating mechanism contemplated by the invention utilizes the sequenced control function inputs 1913 and 1914 from the customer and certain automatic control function outputs created internally of the machine 10 to ultimately produce the desired, sequenced, commodity outputs 1911 and 1912, and secondarily to the manner in which such operating mechanism permits special control of certain commodity outputs during servicing of the machine 10.

The coin handling means 100, upon deposit therein by the customer of proper coinage as at input 1913, produces a control function output which is carried along path 1902, 1915 to the credit means 600 and there applied as an input effective to change the condition of certain switching structure to be later described in the credit means 600. Upon completion of the coinage deposit 1913 and the just-mentioned change of condition within credit means 600, the customer's product selection input 1914 produces a control function output from the customer selection control means 200 which is carried along a path indicated at 1916, 1917 and applied as an input to the homing means 500, through which it passes and emerges as a control function output carried along a path 1918, 1919 from homing means 500 to credit means 600, through which it in turn passes by virtue of the mentioned change of condition in credit means 600 and emerges as a control function output carried along a path 1920, from credit means 600 to homing means 500, where it is effective to change the condition of certain switching structure to be later described in the homing means 500 to a condition correlated with the particular product selected by input 1914. Immediately upon completion of the just mentioned change of condition within homing means 500, the homing means 500 generates a control function output carried along a path as at 1918, 1919 to the credit means 600 where it is applied as an input for changing the mentioned switching structure with credit means 600 to a third condition.

Upon completion of the just mentioned third change of condition of the switching structure of credit means 600, the latter produces a control function output that is carried along path 1920, 1921 to the cup supplying means and there is effective to produce the single cup output 1911, as well as a change of condition of certain switching structure later to be more fully described in the cup supplying means 700. Such change of condition in the cup supplying means 700 produces a control function output carried from the cup supplying means along a path 1922, 1920 to the homing means 500, through which it passes and emerges as a control function output carried along a path 1918, 1923 from homing means 500 to vending means 800, where it is effective to produce the product output 1912. A further control function output automatically produced in the cup supplying means 700 is carried from the latter as by path 1922, 1919 to the credit means 600 for recycling the switching structure thereof to its original condition.

Miscellaneous control function couplings utilized in normal operation and hereinafter explained in detail include a control path 1916, 1924 between the customer selection control means 200 and the product supply means 300, a control path 1906, 1925, 1926 between the product supply means 300 and the cup supplying means 700, and a control path 1906, 1925, 1927 between the product supply means 300 and the vending means 800.

The main control function couplings used in servicing the machine 10 include control path 1928, 1929, 1930 from the servicing control means 400 to coin handling means 100, control path 1928, 1929, 1931 from the servicing control means 400 to the product supply means 300, and control path 1928, 1932 from the servicing control means 400 to the vending means 800.

Having noted these principal control function flow paths in a general way, the following more detailed description of the specific components and connections used should be more readily understood.

CONTROL MECHANISM

Reference is now made to the detailed schematic diagram of Figure 5, which consists of four sheets of drawings identified as Figures 5–A, 5–B, 5–C and 5–D, which it will be understood fit together in the order named to present the complete diagrammatic showing of the control mechanism of the machine 10.

*Coin handling means*

Attention is first directed to that portion of Figure 5–A relating to the coin-handling means 100. Coin handling means 100 includes coin-receiving tube structure generally designated 101 having coin ingress openings 102, 103 and 104 for different denominations of coinage such, for instance, as nickels, dimes and quarters respectively. Coin tube structure 101 includes a coin chute 105 for coins of the smallest denomination which divides into a pair of branches 106 and 107. Branch 106 leads into the top of a change-making coin storage tube 108, while branch 107 leads into a discharge chute 109 for discharging coins into a coin-receiving receptacle 110. Coin tube structure 101 further includes a cute 111 for coins of the next higher denomination and a chute 112 for coins of the highest denomination, both of which merge with the branch 107 at the top of discharge chute 109 so that coins passing through each of branch 107, chute 111 and chute 112 will be delivered to the coin box 110. Manifestly, the coin-receiving tube structure 101 could be modified to accommodate a greater or less number of denominations of coins or coins of different denominations than those mentioned for illustrative purposes.

In the preferred embodiment shown for illustration, it is assumed that all products to be vended by the machine are to have a cost to the customer equal to the value of the coins accommodated by chute 111, for instance, a dime.

A coin operable vend switch generally designated 113 is provided with a swingable polepiece 114 extending into the discharge chute 109 to be momentarily swung out of engagement with a stationary, normally closed contact 115 and into engagement with a stationary, normally open contact 116 every time a coin passes through the discharge chute 109. Since the illustrative embodiment is designed for the vending of products priced at a dime, it is natural that dimes deposited in the ingress opening 103 will simply pass through the chute 111 into the chute 109 where the vend switch 113 is momentarily operated thereby, hence into the coin box 110.

Since the deposit of two nickels by the customer is necessary in order to provide the desired credit of ten cents for the vending of a product, means must be provided to deliver only every other nickel deposited in the nickel chute 105 into the branch 107. This may be accomplished as by a swingable gate 117 pivotally mounted as at 118 at the zone of juncture of the branches 106 and 107 and provided with protuberances 119 and 120 adapted to be engaged alternately by coins deposited in the nickel chute 105. Thus, a first nickel deposited in the chute 105 will be diverted by gate 117 into the branch 106 and delivered to the change-making coin storage tube 108 as one of a supply of change-making nickels 121 stored therein, the protuberance 119 being tripped by such nickel to swing the gate 117 to a position for diverting the next nickel deposited in the chute 105 into the branch 107, from which it will pass through the discharge chute 109, operating the vend switch 113, into the coin box 110.

In the case of the deposit by the customer of a quarter into the chute 112, it will be necessary for the coin-handling means 100 to deliver to the customer appropriate change, which in the illustrated embodiment would consist of three nickels from the supply 121 equalling the fifteen cents change to which the customer would be entitled. To control such change-making function there is provided a change controlling switch 122 having a movable polepiece 123 protruding into the quarter coin chute 112 for actuation by a coin passing through the latter out of engagement with a stationary contact 124 and into engagement with a stationary contact 125. For purposes which will hereinafter be clear, magnetic means generally designated 126 is provided in association with the polepiece 123 for holding the latter in contact with the stationary contact 125 until it is returned to its normal position by a cam 127.

Cam 127 and additional cams 128 and 129 are each operably coupled with an electrical change-making control motor 130 for rotation by the latter. Operably associated with the cam 128 is a normally open switch 131 adapted to be closed upon energization of the motor 130 and to remain closed until the motor 130 has rotated the cam 128 back to its starting or stand-by position. Associated with the cam 129 for operation thereby, is a normally open switch 132 adapted to be closed and then reopened three times during each cycle of operation of the motor 130.

Means for individually dispensing nickels from the change-making supply 121 thereof are provided and may be of various constructions, although for purposes of illustration there is shown a gate member 133 operably coupled with an electrical solenoid 134 for operation by the latter to release a single nickel from the supply 121 upon each energization of the solenoid 134.

A change tube empty indicating switch generally designated 135 has a shiftable polepiece 136 extending into the change supply tube 108 and disposed to normally remain in engagement with a stationary contact 137 when three or more change-making coins 121 are within the tube 108, but adapted to shift out of engagement with contact 137 and into engagement with stationary contact 138 when less than three coins 121 remain in tube 108.

Coin chutes 105, 111 and 112 are respectively provided with devices 139, 140 and 141 for preventing effective deposit of coinage in the corresponding of chutes 105, 111 and 112. As illustrated, such devices 139, 140 and 141 may comprise solenoids each having associated therewith a chute-blocking element 142 adapted to shift into the corresponding of said coin chutes to physically prevent deposit of coinage therein whenever the solenoid is de-energized. Those skilled in the art will appreciate that elements 142 could consist of other means such as gates for diverting deposited coinage into a return chute (not shown), if desired.

Polepiece 114 of coin operable vend switch 113 is coupled with electric power line 90 by a conductor 151. Normally closed contact 115 of switch 113 is coupled with a conductor 1602 leading to credit means 600. Normally open contact 116 of switch 113 is coupled with a conductor 1603 leading to credit means 600. Thus, conductor 1602 carries to credit means 600 a normally energized connection with power line 90, such connection being momentarily interrupted and an alternate connection from power line 90 to credit means 600 completed through conductor 1603 whenever a deposited coin passes through discharge chute 109 to shift polepiece 114 of switch 113.

Polepiece 123 of quarter deposit sensing and change controlling switch 122 is coupled with electric power line 95 by a conductor 152. Normally closed contact 124 of switch 122 is coupled with the polepiece 136 of the change tube empty indicating switch 135 by a conductor 153. Normally open contact 125 of switch 122 is coupled with one side of change-making control motor 130 by conductors 154 and 155, with one side of cycle completing switch 131 for motor 130 associated with cam 128 of the latter by conductors 154, 155 and 156, and by conductor 154 with a conductor 1401 leading to servicing control means 400. The other side of motor 130 is coupled with power line 90 by a conductor 157, while the other side of motor cycling switch 131 is coupled with power line 95 by a conductor 158. One side of change payout solenoid 134 is coupled with power line 95 by a conductor 159, the other side of solenoid 134 being coupled with one side of the change payout switch 132 associated with cam 129 by a conductor 160, while the other side of switch 132 is coupled with power line 90 by a conductor 161. Thus, upon closing of polepiece 123 of quarter deposit sensing switch 122 with contact 125 thereof responsive to passage of a quarter through chute 112, an energizing circuit for change-making motor 130 is completed from power line 95 through conductor 152, polepiece 123, contact 125, conductors 154 and 155, motor 130 and conductor 157 to power line 90.

The magnetic holding means 126 associated with switch 122 is provided to assure that, once polepiece 123 is shifted into engagement with contact 125, such electrical connection will continue at least until an alternate energizing circuit for motor 130 has been completed through cycling switch 131.

Energization of motor 130 commences rotation of cams 127, 128 and 129 associated respectively with switches 122, 131 and 132. Rotation of cam 128 closes switch 131 to complete the mentioned alternate energizing circuit for motor 130 from power line 95 through closed switch 131, conductor 156, motor 130 and conductor 157 to power line 90, the switch 131 remaining closed until all of the cams 127, 128 and 129 have completed a full revolution. Cam 127 restores polepiece 123 of switch 122 to its normal position out of engagement with contact 125 and in engagement with contact 124, such action occurring after cam 128 has closed switch 131. During the full revolution thereof, cam 129 closes and then re-opens switch 132 three times. During each closing of switch 132, the change payout solenoid 134 is energized and actuates tthe gate device 133 to release a single nickel to the customer as change from the supply of nickels 121 in change tube 108, the energizing circuit for solenoid 134 being from power line 95 through conductor 159, solenoid 134, conductor 160, switch 132 and conductor 161 to power line 90. Thus, whenever a quarter is deposited in chute 112, energization of motor 130 by coin produced operation of switch 122 causes the solenoid 134 to be energized three times by the closing of switch 132, thereby delivering three nickels in change to the customer.

Normally open contact 138 of change tube switch 135 is coupled with a conductor 1201 leading to the customer selection control means 200. Normally closed contact 137 of switch 135 is coupled by a conductor 162 with one side of quarter deposit-inhibiting solenoid 141. One side of each of the nickel deposit-inhibiting solenoid 139 and the dime deposit-inhibiting solenoid 140 is coupled with power line 95 by conductive means 163, 164 and 165. The other side of each of solenoids 139, 140 and 141 is coupled by conductive means 166, 167, 168 and 169 with a conductor 1601 leading to the credit means 600. Thus, anticipating the fact that conductor 1601 is under normal conditions ultimately coupled with power line 90, as will be further explained hereinafter, it will be seen that solenoids 139 and 140 respectively associated with the deposit-inhibiting elements 142 in the nickel and dime chutes 105 and 111 respectively are normally kept energized to clear chutes 105 and 111 for effective deposit of coinage, the circuit being traceable from conductor 1601 through conductive means 168 and 166 (or 167), solenoid 139 (or 140), conductive means 163 (or 164), and conductor 165 to power line 95. In the case of quarter deposit-inhibiting solenoid 141, however, the energizing circuit is traceable, from the side thereof coupled with conductor 1601 by conductor 169, through conductor 162, normally engaged contact 137 and polepiece 136 of change tube switch 135, conductor 153, normally closed contact 124 and polepiece 123 of quarter deposit-sensing switch 122, and conductor 152 to power line 95. Thus, the solenoid 141 will be de-energized to prevent deposit of further quarters, not only when conductor 1601 is de-energized as later to be discussed, but also when either the supply of change-making coins 121 has become inadequate for proper return of change to a customer or during the completion of a change-making cycle after deposit of a previous quarter, switches 135 and 122 respectively being responsible for such last-mentioned results.

*Customer selection control means*

Attention is now directed to that portion of Figure 5-A relating to the customer selection control means 200. Means 200 includes a "use correct change only" sign activating lamp 201, a "coffee sold out" sign activating lamp 202, and a "chocolate sold out" sign activating lamp 203, all disposed in machine 10 to appropriately display the corresponding message to a potential customer when they are energized. Correct change lamp 201 has one side thereof coupled with conductor 1201 leading to coin-handling means 100, and, more specifically, to normally open contact 138 of change tube switch 135, and the other side thereof coupled to a conductor 2601 leading to the credit means 600. Anticipating the fact that the conductor 2601 is normally ultimately coupled with the power line 90, it will be seen that a circuit for energizing the correct change lamp 201 whenever the polepiece 136 of change tube switch 135 is closed with contact 138 of the latter by depletion of the change coin supply 121 in change tube 108, is completed from conductor 2601 through lamp 201, conductor 1201, closed contact 138 and polepiece 136 of change tube switch 135, conductor 153, normally closed contact 124 and polepiece 123 of quarter deposit sensing switch 122, and conductor 152 to power line 95.

Coffee sold out lamp 202 has one side thereof coupled with power line 95 by a conductor 251 and the other side thereof coupled with a conductor 2302 leading to the product supply means 300. Similarly, chocolate sold out lamp 203 has one side thereof coupled with power line 95 by a conductor 252 and the other side thereof coupled with a conductor 2303 leading to the product supply means 300. It will be understood that structure later to be described provides for ultimate coupling of conductor 2303 with power line 90 for energizing lamp 203 when the supply of chocolate preparing powder in dispenser 26 is exhausted, for ultimate coupling of conductor 2302 with power line 90 for energizing lamp 202 when the supply of coffee cans 18 is exhausted, and for ultimate coupling of both of conductors 2302 and 2303 with power line 90 when the supply of cups 23 in cup-supplying means 700 is exhausted.

Customer selection control means 200 further includes a number of customer product selection single pole, double-throw, push-button switches 204, 208, 212, 216, 220 and 224, all disposed on machine 10 for access thereto and operation thereof by a customer. Obviously, a greater or lesser number of product selection switches 204 et seq. could be provided in different embodiments of machine 10 depending upon the number of product selections to be provided therein.

Selection switch 204, which has a shiftable polepiece 205, a normally open contact 206 and a normally closed contact 207, is for selection of coffee with cream and a single measure of sugar. Selection switch 208, which has a shiftable polepiece 209, a normally open contact 210 and a normally closed contact 211, is for selection of coffee without cream or sugar. Selection switch 212, which has a shiftable polepiece 213, a normally open contact 214 and a normally closed contact 215, is for selection of coffee with cream only. Selection switch 216, which has a shiftable polepiece 217, a normally open contact 218 and a normally closed contact 219, is for selection of coffee with a single measure of sugar only. Selection switch 220, which has a shiftable polepiece 221, a normally open contact 222 and a normally closed contact 223, is for selection of coffee with cream and a double measure of sugar. Selection switch 224, which has a shiftable polepiece 225, a normally open contact 226 and a normally closed contact 227, is for selection of hot chocolate.

Normally open contacts 206, 210, 214, 218, 222 and 226 of selection switches 204, 208, 212, 216, 220, and 224 respectively are coupled respectively with conductors 2501, 2502, 2503, 2504, 2505 and 2506, all of which lead to the homing means 500. Polepiece 225 of switch 224 is coupled with a conductor 2301 leading to the product supply means 300. Polepiece 205 of switch 204 is coupled with a conductor 2304 leading to the product supply means 300. Normally closed contact 207 of switch 204 is coupled with polepiece 209 of switch 208 by a conductor 253. Normally closed contact 211 of switch 208 is coupled with polepiece 213 of switch 212 by a conductor 254. Normally closed contact 215 of switch 212 is coupled with polepiece 217 of switch 216 by a conductor 255. Normally closed contact 219 of switch 216 is coupled with polepiece 221 of switch 220 by a conductor 256. Normally closed contact 223 of switch 220 is coupled with normally closed contact 227 of switch 224 by a conductor 257, and both are further coupled with a conductor 2305 leading to the product supply means 300.

Thus, it will be apparent that a customer, by his choice of one of the selection switches 204 et seq. in the customer selection control means 200, may complete any of a number of alternate circuits between the homing means 500 and the product supply means 300.

*Product supply means*

Attention is now directed to that portion of Figure 5–B relating to the product supply means 300. Means 300 includes a reversible, electric, operating motor 20 for coffee brewing unit 17. Motor 20 has field windings 301, and a pair of armature brush connections 302 and 303. Associated with motor 20 and illustrated as located within the product supply means 300 because it is conveniently provided as a physically associated part of motor assembly 20, although actually considered from the functional viewpoint as a part of servicing control means 400, is a manually operable, double pole, double throw, motor reversing switch generally designated 401 and having a pair of ganged, shiftable polepieces 402 and 403 normally engaged respectively with stationary contacts 404 and 405 but adapted to be manually shifted into respective engagement with stationary contacts 406 and 407. Brush connection 302 of motor 20 is coupled with power line 95 by a conductor 351. Brush connection 303 is coupled with normally open contact 406 and normally closed contact 405 of reversing switch 401 by conductive means 3401. The opposite ends of field windings 301 are respectively coupled with polepieces 402 and 403 of reversing switch 401 by conductive means 3402 and 3403 respectively. Normally closed contact 404 is coupled with a conductor 451 leading to a portion of the servicing control means 400 to be later described. Normally open contact 407 is coupled with power line 90 through a conductor 452.

It should be noted that those skilled in the art will appreciate that the coffee brewing means 17 could vary considerably as to type and details without departing from the broader principles of the invention, as long as such means 17 is electrically operable. Similarly, electrically operable structure for preparing and storing a quantity of an entirely different product (for instance, tea) or product ingredient (for instance, carbonated water) could be substituted for the coffee brewing means 17. As the description of the invention progresses, it will be further apparent that the same is true, in greater or lesser degree, as to each of the hot chocolate powder dispenser 26, the sugar dispenser 27, the cream dispenser 31 and the cup dispenser utilized in cup-supplying means 700. It should be understood, therefore, that the preferred embodiment of machine 10 adapted for vending hot chocolate and coffee is intended as illustrative only and has been chosen as expository of the principles of the invention since it teaches the adaptation of the control mechanism contemplated by the invention to a machine 10 involving all of the problems associated with a product whose ingredients are acted upon only at the time of vending each customer portion (such as hot chocolate), a product at least some of whose ingredients should be automatically acted upon in larger quantities than required for vending a single customer portion and the resultant product preparation then stored for subsequent vending of portions thereof (such as coffee), and products requiring the coordinated, prior dispensing of a cup or other vended receptacle therefor.

Returning to the preferred form of coffee brewing means 17 chosen for illustration, however, it will be understood that the reversing switch 401 is used only for reversing the brewing unit motor 20 in the event that a can 18 should have become jammed in means 17, the reverse operating circuit being traceable from power line 95 through conductor 351, armature connections 302 and 303 of motor 20, conductor 3401, then closed polepiece 402 and contact 406 of reversing switch 401, conductor 3402, field windings 301 of motor 20, conductor 3403, then closed polepiece 403 and contact 407 of switch 401, and conductor 452 to power line 90. The normal, forward, automatic energizing circuit for coffee brewing unit motor 20 is traceable from power line 95 through conductor 351, armature connections 302 and 303, conductor 3401, normally closed contact 405 and polepiece 403 of switch 401, conductor 3403, field windings 301 of motor 20, conductor 3402, and normally closed polepiece 402 and contact 404 of switch 401 to a conductor 451 leading through control switching structure to be later described adapted for ultimately coupling the conductor 451 with power line 90 whenever motor 20 should be energized for brewing a batch of coffee.

In the preferred form of coffee brewing unit 17, the motor 20, when operated in a forward direction, functions successively during each cycle of operation thereof (by mechanical means known to the art and not constituting a part of the novel subject matter of the present invention and, therefore, not illustrated nor described in detail herein) to move into engagement with a can 18 disposed in brewing position in unit 17 means for piercing the same and placing the coffee grounds therewith in sealed communication with conduits 52 and 58 (see Figure 3) to maintain the can 18 and the mentioned piercing and sealing means in such operative disposition during a period of passage of hot water through the can 18 to brew fresh coffee by the infusion process, to withdraw such piercing and sealing means from engagement with the can 18, to discharge the used can 18 from the brewing unit 17 into the receptacle 40 (see Figure 1), and to move a new can 18 of coffee from the rack 19 (see Figure 1) into brewing position. Brewing unit 17 is, therefore, provided with a can switch 304 that is closed when a can 18 is in brewing position within unit 17 (which is the normal condition), a ganged, double pole, double throw switch generally referred to as the "in switch" and designated by the numeral 305 which is normally in the condition shown in Figure 5–B and operates when the mentioned can piercing and sealing means are moved into operative position engaging a can 18, and a single pole, double throw switch generally referred to as the "out switch" and designated by the numeral 306 which is normally in the condition shown in Figure 5–B and operates when the mentioned can piercing and sealing means are moved out of operative position and not engaging a can 18.

"In switch" 305 has a first polepiece 307 normally in engagement with a contact 308 but shiftable into engagement with a contact 309, and a second polepiece 310 normally in engagement with a contact 311 but shiftable into engagement with a contact 312, as noted above. "Out switch" 306 has a polepiece 313 normally in engagement with a contact 315 but shiftable into engagement with a contact 314, as noted above.

Product supply means also includes a coffee brewing timer motor 316 having three cam-operated, time-sequenced switches 317, 318 and 319 operably associated therewith. Switch 317 is a normally open, single pole, single throw switch. Switch 318 has a polepiece 320 normally in engagement with a contact 321 but shiftable into engagement with a contact 322. Switch 319 has a polepiece 323 normally in engagement with a contact 324 but shiftable into engagement with a contact 325.

The waste tank switch 80 (also see Figure 3) is shown as a part of the product supply means 300, and will be seen to comprise a polepiece 326 normally in engagement with a contact 327 but shiftable into engagement with a contact 328 when waste tank 41 (see Figure 3) is filled to a predetermined level. Brew cycle start switch 70 (also see Figure 3), which is associated with the means 66, 67, 68 and 69 for sensing the level of brewed coffee stored in chamber 61 of reservoir 21, is shown as a part of the product supply means 300, and comprises a normally open, single pole, single throw switch adapted to close when supply of brewed coffee in chamber 61 is depleted. Similarly, the solenoid 48 for opening the normally closed main water valve 47 when energized and the solenoid 55 for opening the normally closed coffee brewing water valve 54 when energized are shown as a part of product supply means 300 in Figure 5–B, as well as in Figure 3.

At 329 is shown an electrical heating element associated with water heater 16 (see Figure 3), and a normally closed, thermostatic, control switch 330 for energizing heating element 329 until water in water heater 16 has reached a predetermined, elevated temperature. Heating element 329 and thermostatic switch are coupled in series between power lines 90 and 95 by conductive means 351 and 352. Also coupled between power leads 351 and 352 are the blower motor 44 (also see Figure 2), strip heater elements 331 for conduits 49, 52 and 53 (see Figure 3), and motor 34 for the compressor 34' used in refrigerating cream in the machine 10 (see Figure 2), such motor having a thermostatic control switch 332 connected in series therewith between power leads 351 and 352.

The solenoid 77 for opening normally closed dump valve 76 (see Figure 3) and a clock-like, dump timer motor 333 having a normally open, automatic coffee dump control switch 334 associated therewith are also provided in product supply means 300 and shown on Figure 5–B.

Generally designated by the numeral 335 is a coffee "sold-out" switch having a pair of ganged portions 336 and 337, both of which will be understood to be operably coupled with the level sensing means 68, 69 (see Figure 3) for actuation whenever the stored supply of brewed coffee ready for vending in chamber 61 of reservoir 21 is exhausted. Switch portion 336 is a normally closed, single pole, single throw switch, while switch portion 337 has a polepiece 338 normally in engagement with a contact 339 but shiftable into engagement with a contact 340. Switch portion 336 is coupled in series with an electrical heating element 341 associated with the coffee reservoir 21 for maintaining brewed coffee within the latter in heated condition and also coupled in series with a normally closed, thermostatic, control switch associated with the coffee reservoir 21 and adapted to open only when coffee in the reservoir 21 is at a predetermined, elevated temperature. The series combination of switch portion 336, heater element 341 and thermostatic switch 342 is coupled in its entirety between power lines 90 and 95.

An inoperative condition sensing relay coil 343 has operably associated therewith a pair of relay switch portions 344 and 345, switch portion 344 being associated with certain circuits pertaining to the hot chocolate product and including a polepiece 346 normally in engagement with a contact 347 but shiftable into engagement with a contact 348 upon energization of coil 343, while switch portion 345 is associated with certain circuits pertaining to the coffee product and comprises a normally open, single pole, single throw switch adapted to be closed upon energization of coil 343.

A hot chocolate dispensements counting switch 349 is provided and has operably associated therewith an electrically responsive, solenoid-like, counter device 350 adapted for operating the switch 349 only upon device 350 having been energized a predetermined number of times. Such devices as at 350 are per se conventional and can be manually reset as when servicing the machine 10. Switch 349 has a polepiece 353 normally in engagement with a contact 354 but shiftable into engagement with a contact 355.

Finally, insofar as the control components of product supply means 300 is concerned, there is a normally open, thermostatic, single pole, single throw, water temperature sensing switch 356, which is operably associated with the water heater 16 (see Figure 3) and closes whenever water within heater 16 is at a temperature sufficiently elevated for the production of properly prepared coffee or hot chocolate.

One side of each of main water valve operating solenoid 48 and brewing water valve operating solenoid 55 is coupled with power line 95 by conductive means 357. Contact 308 of "in switch" 305 is coupled by a conductor 358 with a conductor 3801 leading to the vending means 800 and with a conductor 3401 leading to the servicing control means 400. Polepiece 307 of "in switch" 305 is coupled with the side of main water valve operating solenoid opposite power line 95 by a conductor 359. Contact 309 of "in switch" 305 is coupled by conductive means 360 with contact 312 of "in switch" 305, one side of coffee brewing timer switch 317, polepiece 323 of coffee brewing timer switch 319 and one side of coffee brewing timer motor 316, the other side of motor 316 being coupled with power line 95 through a conductor 361. Contact 311 of "in switch" 305 is coupled by conductors 362 and 363 with contact 314 of "out switch" 306 and by conductor 362 with a conductor 3402 leading to the servicing control means 400. Can switch 304 and coffee brewing start switch 70 are coupled in series with each other and between polepiece 310 of "in switch" 305 and contact 320 of coffee brewing timer switch 318 by conductors 364 and 365.

The other side of coffee brewing timer switch 317 is coupled with coffee brewing water valve operating solenoid 55 by conductive means 366. Polepiece 320 of brewing timer switch 318 is coupled by a conductor 367, series connected water temperature sensing switch 356 and a conductor 368 with contact 325 of brewing timer switch 319, said contact 325 and the adjacent side of switch 356 also being coupled by conductors 369 and 370 with one side of dump control switch 334 (the other side of which switch 334 is coupled with one side of dump valve operating solenoid 77), by conductors 369 and 371 with contact 327 of waste tank switch 80, and by conductor 369 with a conductor 3702 leading to the cup supplying means 700. Contact 322 of brewing timer switch 318 is coupled with polepiece 313 of "out switch" 306 by a conductor 372. Contact 324 of brewing timer switch 319 is coupled with contact 315 of "out switch" 306 by a conductor 373.

Power line 90 is coupled by conductive means 374 with one side of coffee dump timer motor 333, and by conductive means 374 and 375 with polepiece 326 of waste tank switch 80. Contact 328 of waste tank switch 80 is coupled by conductors 376 and 377 with one side of relay coil 343, and by conductor 376 to a conductor 3701 leading to the cup supplying means 700. Power line 95 is coupled by conductive means 378 with the other side of each of the dump timer motor 333, the dump valve operating solenoid 77, and the relay coil 343.

One side of relay switch portion 345 is coupled by a conductor 379 with contact 340 of coffee "sold-out" switch portion 335, and both are in turn coupled with conductor 2302 leading to the coffee "sold-out" lamp 202 in the customer selection control means 200. The other side of relay switch portion 345 is coupled with pole-piece 346 of relay switch portion 344 and both are in turn coupled with conductor 2305 leading to contact 227 of product selection switch 224 and contact 223 of product selection switch 220 in the customer selection control means 200. Contact 347 of relay switch portion 344 is coupled with a conductor leading to the credit means 600. Contact 348 of relay switch portion 344 is coupled with contact 355 of chocolate counter switch 349 by a conductor, and both are coupled with a conductor 2303 coupled with the chocolate "sold-out" lamp 203 in customer selection control means 200.

One side of chocolate counter switch actuating device 350 is coupled with power line 95 through a conductor, and the other side of device 350 is coupled by a conductor 382 with a conductor 3403 leading to servicing control means 400, a conductor 3704 leading to the cup supplying means 700, and a conductor 4803 leading to the vending means 800. Polepiece 353 of chocolate counter switch 349 is coupled by conductive means 383 with polepiece 338 of coffee "sold-out" switch portion 337, and by conductive means 383 and 384 with a conductor 3602 leading to the credit means 600 and a conductor 3703 leading to the cup supplying means 700. Contact 354 of chocolate counter switch 349 is coupled with conductor 2301 leading to the polepiece 225 of product selection switch 224 in the customer selection control means 200. Contact 339 of coffee "sold-out" switch portion 337 is coupled with a conductor 2304 leading to polepiece 205 of product selection switch 204 in customer selection control means 200.

*Normal coffee brewing operation*

Assume that a machine 10 has just been installed, that a source of electrical power has just been connected with power lines 90 and 95, that there is no supply of brewed coffee in chamber 61 of reservoir 21, that the waste tank 41 is empty, that there is a can of coffee 18 in the brewing position within brewing unit 17, and that there is cool water in the water heater 16. All switches and other parts of the machine 10 will stand in the conditions indicated in Figure 5, except that the brewing cycle start switch 70 will be closed and the coffee "sold-out" switch 335 will be operated.

The fact that start switch 70 is closed has no immediate effect, in view of the fact that water temperature sensing switch 356 is open because of the coolness of the water in water heater 16. The fact that coffee "sold-out" switch 335 is operated opens the energizing circuit for the heating element 341 associated with the reservoir 21, and also energizes the coffee "sold-out" lamp 202 through a circuit including polepiece 338 and contact 340 of switch portion 337.

Heating element 329 associated with water heater 16 is, however, immediately energized through a circuit traceable from power line 90, through conductor 352, heating element 329, closed thermostatic switch 330, and conductor 351 to power line 95. As soon as the water in heater 16 is sufficiently heated for successful brewing to be accomplished, thermostatic temperature sensing switch 356 closes.

Closure of switch 356 completes an energizing circuit for brewing unit motor 20 traceable from power line 90 through conductors 374 and 375, polepiece 326 and contact 327 of waste tank switch 80, conductors 371 and 369, closed temperature sensing switch 356, conductor 367, polepiece 320 and contact 321 of brewing timer switch 318, conductor 365, closed start switch 70, closed can switch 304, conductor 364, polepiece 310 and contact 311 of "in-switch" 305, conductors 362 and 3402, normally engaged contact 410 and polepiece 409 of a switch 408 later to be described in connection with the servicing control means 400, a conductor 451, contact 404 and polepiece 402 of reversing switch 401, conductor 3402, field windings 301 of motor 20, conductor 3403, polepiece 403 and contact 405 of reversing switch 3401, armature connections 303 and 302 of motor 20, and conductor 351 to power line 95.

Upon energization, motor 20, in the course of completing the shifting of certain piercing and hydraulic coupling means into operative association with the can of coffee 18 in brewing position the brewing unit 17, first de-actuates the "out switch" 306 to move polepiece 313 out of the engagement with contact 315 and into engagement with contact 314, which has no immediate effect, then actuates "in-switch" 305 to move polepiece 310 out of engagement with contact 311 and into engagement with contact 312 and to move polepiece 307 into engagement with contact 309.

Such separation of polepiece 310 and contact 311 of "in-switch" 305 breaks the above-traced circuit for motor 20 and de-energizes the latter. Engagement of polepiece 310 with contact 312, however, completes an energizing circuit for the brewing timer motor 316 traceable as above to polepiece 310, then through contact 312, conductive means 360, motor 316 and conductor 361 to power line 95. Similarly, engagement of polepiece 307 with contact 309 energizes the main water valve operating solenoid 48 to open valve 47 and apply the pressure from the water main to the water in heater 16 through a circuit traceable as above to polepiece 310, then through contact 312, conductive means 360, contact 309, polepiece 307, conductor 359, solenoid 48 and conductor 357 to power line 95.

Upon energization of timing motor 316, same first closes polepiece 323 with contact 325 of its cam operated timing switch 319. This completes a temporary holding circuit for motor 316 traceable as for the original energizing circuit to conductor 369, then through conductor 368, contact 325 and polepiece 323 of timing switch 319, conductive means 360, motor 316, and conductor 361 to power line 95.

Timing motor 316 next closes its cam operated timing switch 317 to energize the brewing water valve operating solenoid 55 through a circuit traceable as above to conductive means 360, then through closed timing switch 317, conductor 366, solenoid 55 and conductor 357 to power line 95. Solenoid 55 is kept energized for a predetermined period of time to pass a predetermined amount of heated water through open valve 54, conduit 52, the can 18 in brewing position in unit 17, from which it passes as freshly brewed coffee through conduit 58 into reservoir 21, it being noted that a water pressure regulator (not shown) will normally be provided in conduit 49 to render the quantity of water flow proportional to time. After valve 54 has been maintained open for the desired time, motor 316 opens cam operated switch 317 and, solenoid 55 is de-energized to close brewing water valve 54. The significance of the above-mentioned holding circuit for motor 316 now becomes apparent, since delivery of freshly brewed coffee to reservoir 21 may open the brew start switch 70.

Brewing timer motor 316 next closes polepiece 320 with contact 322 of cam operated timing switch 318. This completes a re-energizing circuit for the brewing unit motor 20 traceable as above for its original energizing circuit to conductor 367, then through polepiece 320 and contact 322 of timer switch 318, conductor 372, closed polepiece 313 and contact 314 of "out-switch" 306, and conductor 363 to conductor 3402, thence as above traced. Brewing unit motor 20, upon such re-energization thereof, moves the mentioned piercing and hydraulic coupling structure out of operative association with the used can 18, ejects the used can 18 out of the brewing unit 17 and into receptacle 40, and moves a new can 18 from the rack 19 into brewing position within the unit 17, and, during the course thereof, the "in-switch" 305 is restored to its normal condition de-energizing main water valve operating solenoid 48, and the "out-switch" 306 de-energizing brewing unit motor 20.

Cam-operated timer switch 318 is then restored to its normal condition by motor 316. Finally, as timing motor 316 completes its cycle, cam-operated timing switch 319 is restored to its normal condition and the timing motor 316 is de-energized. All components of the coffee brewing apparatus are then in their normal stand-by condition as originally asssumed, except that the brewing start switch 70 will be open, the temperature sensing switch 356 will normally remain closed, the "sold-out" switch 336 portion will have closed to energize the coffee reservoir heating element 341, and the "sold-out" switch portion 337 will have returned to its normal condition to de-energize the coffee "sold-out" lamps 202.

As soon as sales of coffee from the machine 10 have sufficiently depleted the supply thereof in reservoir 21, the brewing start switch 70 will again close and the above-described brewing cycle will be performed automatically. It is significant that by utilizing a timed brewing cycle, rather than attempting to pass water through a can 18 of coffee until compartment 61 of reservoir is filled to a given level, precise consistency of flavor is maintained by passing exactly the same amount of water through each can 18 of coffee. It will also be noted that brewing of coffee may be carried on concurrently with vending thereof and that, by virtue of the timed brewing cycle employed, even substantially continuous demand for and vending of coffee will not alter the consistency of the batch being brewed.

The automatic dump timer motor 333 is set to close switch 334 for a predetermined period early each morning before the opening of business, thereby energizing solenoid 77 to open dump valve 76 for draining from compartment 61 of coffee reservoir 21 all old coffee that has stood over night. Such dumping of old coffee from compartment 61 closes brewing start switch 70, which starts a brewing cycle as above described to prepare fresh coffee with which to start the day's business.

It will be noted that filling of waste tank 41 operates waste tank switch 80 to break all of the above-described circuits necessary to initiating or carrying through a coffee brewing cycle. Similarly, exhaustion of unused cans 18 or failure for any reason of a can 18 to be delivered into brewing position within the unit 17 on the last previous cycle thereof would leave can switch 304 open to prevent automatic energization of motor 20 or initiation of a new brewing cycle until the machine 10 had been serviced.

*Servicing control means*

Attention is now directed to that portion of Figure 5–B relating to the servicing control means 400. As the designation implies, such means 400 are for the convenience of authorized personnel in servicing the machine 10 and are disposed where customers will not have access thereto. Means 400 includes, besides the brewing motor reversing switch 401 described above and a manual cup-dispensing switch described in connection with cup-supplying means 700, a manually operable, single pole, double throw, coffee brewer motor operating switch 408 having a polepiece 409 normally in engagement with a contact 410 but shiftable into engagement with a contact 411; a manually operable, single pole, double throw, clean-up switch 412 having a polepiece 413 normally in engagement with a contact 414 but shiftable into engagement with a contact 415; a manually operable, normally open, single pole, single throw, dump switch 416; and a manually operable, normally open, single pole, single throw, change coin pay-out switch 417.

Polepiece 409 and contact 410 of manual brewing motor operating switch 408 are respectively coupled with above-mentioned conductors 451 and 3402 and normally provide a closed connection therebetween for normal energization of brewing motor 20 automatically by the above-described control structure of product supply means 300. However, contact 411 of switch 408 is coupled with power line 90 by a conductor 453 and provides for the serviceman, upon manual operation of switch 408, a means of directly energizing the motor 20 during testing or other servicing of brewing unit 17.

Similarly, the polepiece 413 and contact 414 are respectively coupled with conductive means 3403—3704—4803 and 3401—3801 and normally provide a closed connection therebetween for purposes hereinafter to be described in connection with the vending of hot chocolate. However, contact 415 of clean-up switch 412 is coupled with power line 90 through a conductor 454, so that, by operating switch 412 manually, a serviceman can simultaneously energize solenoids 48 and 57 to open the main water valve 47 and the hot chocolate preparing water valve 56, which will release hot water into the mixing bowl 36.

Manual dump switch 416 is coupled between conductors 4801 and 4802 and provides, when operated, an energizing circuit for the dump valve operating solenoid 77 traceable through the waste tank switch 80 and a switch later to be described in connection with the cup-supplying means 700 where it is normally located, although properly considered as a part of the servicing control means 400, which is also manually operated and functions to dispense a cup 23 onto the cup stand 78 each time it is actuated.

Manual pay-out switch 417 is coupled between a conductor 455 connected with power line 95 and a conductor 1401 leading to the change pay-out control motor 130. By operating switch 417, a serviceman can cause motor 130 to reduce the supply of change-making coins 121 in tube 108.

*Homing means*

Attention is now directed to that portion of Figure 5–C relating to the homing means 500. Certain mechanical aspects of the improvements incorporated in a preferred form of switching apparatus used to provide the homing means 500 in machine 10 will be later described. Turning now, therefore, to the electrical aspects of homing means 500, same will be seen to include four electrical switch sections of the rotary type and generally designated by the numerals 501, 502, 503 and 504.

Each of homing switch sections 501, 502, 503 and 504 has, in the illustrated embodiment, twelve stationary contacts displaced from each other by equal angles and identified on Figure 5–C by letters from "*a*" to "*l*" and hereinafter by such letters preceded by the numeral assigned to the homing switch section on which the referred to contact is located. Each of homing switch sections 501, 502, 503 and 504 is also provided with a rotatable contact element respectively designated 505, 506, 507 and 508.

Rotatable contact element 505 of homing switch section 501 has two protuberances or pole pieces 509 and 510 extending oppositely therefrom and adapted to simultaneously engage an opposite pair of stationary contacts, such as 501*a* and 501*g*, 501*b* and 501*h*, etc. Rotatable contact element 506 has four pairs of opposed contacts angularly separated from each other by 30° of arc between each adjacent pair thereof, such protuberances or poles being collectively referred to by the numeral 511. It will be noted that poles 511 will simultaneously engage all of the stationary contacts of the switch section 502 except one opposing pair thereof, such as 502*a* and 502*g*, 502*b* and 502*h*, etc. Rotatable contact element 507 of homing switch section 503, like rotatable contact 505 of section switch 501, has a pair of opposed protuberances or poles designated 512 and 513, adapted to simultaneously engage any opposed pair of the stationary contacts of section 503, such as 503*a* and 503*g*, 503*e* and 503*k*, etc. Similarly, rotatable contact element 508 of homing switch section 504 has a pair of directly opposed protuberances or poles 514 and 515 adapted to successively engage any opposed pair of the stationary contacts of homing switch section 504, such as 504*a* and 504*g*, 504*b* and 504*h*, etc.

The rotatable contact elements 505, 506, 507 and 508 are all ganged together for simultaneous rotation in a direction clockwise as illustrated in Figure 5–C, such rotation of elements 505, 506, 507 and 508 being accomplished by an operative coupling with a homing switch solenoid 516. As will later be made clear from a description of the mechanical aspects of the switching structure used in the homing means 500, the rotatable contact elements 505, 506, 507 and 508 are advanced one step clockwise upon deenergization of the solenoid 516 by means which are readied or cocked to produce such rotation during energization of the solenoid 516. Also, operably coupled with the homing switch solenoid 516 is a normally closed, single pole, single throw interrupting switch 517 which remains closed so long as solenoid 516 is deenergized and is open upon and during energization of solenoid 516.

One side of solenoid 516 is coupled with power line 95 by conductive means 551, while the other side of solenoid 516 is coupled with one side of interrupter switch 517 by a conductor 552, the other side of interrupter switch 517 is coupled with a conductor 5601 leading to a similar interrupter switch hereinafter to be described in connection with the credit means 600.

Contacts 501*a*, 501*b*, 501*c*, 501*d*, 501*e* and 501*f* are respectively coupled with contacts 502*a*, 502*b*, 502*c*, 502*d*, 502*e* and 502*f* and with conductors 2501, 2502, 2503, 2504, 2505 and 2506 leading to contacts 206, 210, 214, 218, 222 and 226 of product selection switches 204, 208, 212, 216, 220 and 224 respectively in the customer's selection control means 200 by means of conductors 553, 554, 555, 556, 557 and 558 respectively. Rotatable contact element 505 of homing switch section 501 is coupled by an appropriate wiper upon a conductor 5602 leading to a portion of the switching structure provided in credit means 600, as will hereinafter be more fully explained.

Rotatable contact element 506 is coupled by an appropriate wiper or the like on a conductor 5603 with another part of the switching structure of the credit means 600, later to be described.

It may be noted that before leaving the description of the electrical aspects of homing switch sections 501 and 502, that, as will later be explained in connection with the mechanical aspects of such structure, the conductive coupling between corresponding stationary contacts of switch sections 501 and 502, such as are referred to hereinabove as conductors 553 to 558, may simply consist of a conductive rivet or the like extending between the wiper means or other structure constituting the stationary contacts of these switch sections 501 and 502. Similarly, the rotatable contact elements 507 and 508 of homing switch sections 503 and 504 respectively are shown in the schematic diagram of Figure 5–C as being interconnected by conductive means 559 and 560 each of which might be presumed to be provided with an appropriate wiper element thereon in engagement with the corresponding rotatable contact element 507 or 508; however, as will later be made apparent, contact elements 507 and 508 may be more directly interconnected by particular mechanical construction so that only one wiper and conductor 559 or 560 would be required.

In any event, conductive means 559 or 560 will be understood to be coupled with a conductor 5704 leading to the cup supplying means 700 for purposes later to be made apparent.

Contacts 503*a*, 503*b*, 503*c*, 503*d* and 503*e* are coupled together by conductive means 563 and in turn coupled with a conductor 5701 leading to cup supplying means 700. Contact 503*f* is coupled with a conductor 5702 also leading to cup supplying means 700. Contact 503*k* is coupled with conductor 5703 similarly leading to cup supplying means 700. It may now be noted that switch contacts 503*a* to 503*e* inclusive are connected with the functioning of cup dispensing structure later to be described, while contact 503*f* is connected with means later to be described for dispensing of the chocolate powder, and contact 503*k* is connected with means later to be described for dispensing a double measure of sugar.

Contacts 504*a*, 503*c*, 504*e* and 504*f* are coupled together by conductive means 561 and in turn coupled with a conductor 5801 leading to the vending means 800 in connection with a cream dispensing function. Contacts 504*g*, 504*j*, 504*k* and 504*l* are coupled together by conductive means 562 and in turn coupled with a conductor 5802 leading to the vending means 800 and having an operable association with the vending of a single measure of sugar.

*Credit means*

Attention is now directed to that portion of Figure 5–C relating to the credit means 600. As with the homing means 500, cetrain mechanical aspects of the switching structure used in credit means 600 will be later described to disclose the mechanical improvements therein. Accordingly, turning to the electrical aspects of credit means 600, same will be seen to include two electrical switch sections of rotary type and generally designated by the numerals 601 and 602.

Each of credit switch sections 601 and 602, has, in the illustrated embodiment, twelve stationary contacts displaced by each other by equal angles and identified on Figure 5–C by letters from "*a*" to "*l*" and hereinafter by such letters preceded by the numeral assigned to the credit switch section on which the referred to contact is located. Credit switch sections 501 and 502 are respectively provided with rotatable contact elements 603 and 604 each of which has four protuberances or poles extending at right angles to each other therefrom, the poles of elements 603 of section 601 being designated 605, 606, 607 and 608 while the poles of contact 604 of switch section 602 are designated by the numerals 609, 610, 611 and 612.

Rotatable contact elements 603 and 604 are electrically interconnected in any suitable fashion as by a conductor 613, although it will be noted that rotatable contact elements 603 and 604 are ganged for rotation together, so that a more direct electrical coupling therebetween could be effected by appropriate mechanical construction.

Credit means 600 further includes a credit switch operating solenoid 616 which is adapted, upon energization thereof, to open a single pole, single throw interrupter switch 617 operably connected therewith and, upon deenergization thereof, to advance the rotatable contact elements 603 and 604 of credit switch sections 601 and 602 one step in a clockwise direction as same are illustrated in Figure 5–C.

One side of credit operating solenoid 616 is coupled by a conductor 651 with power line 95 and the other side of solenoid 616 is coupled by conductive means 653 with each of the contacts 601*d*, 601*e* and 601*f*. Contact 601*a* is coupled with a conductor 1603 leading to normally open contact 116 of the vend switch 113 in the coin handling means 100. Contact 601*b* is coupled with conductor 5602, which, as above noted, leads to the rotatable contact element 505 of switch section 501 in homing means 500. Contact 601*c* is coupled with a conductor 3602 in turn coupled with pole 338 of coffee sold-out switch 335 in product supply means 300, pole piece 353 of chocolate counting switch 349 in product supply means 300 and conductor 3703 leading to a portion of cup supplying means yet to be described.

Contact 602*g* is coupled with a conductor 2601 and an interconnected conductor 1601 which respectively lead to the correct change lamp 201 in the customer's selection control means 200 and the common energizing line for coin chute clearing solenoids 139, 140 and 141. Contact 602*h* is coupled by a conductor 618 with one side of interrupter switch 617, the other side of switch 617 being coupled with conductor 5601 leading to the interrupter switch 517 in the homing means 500.

Contact 602*i* is coupled with a conductor 6701 leading to the cup supplying means. Contact 602*j* is coupled with a conductor 3601 leading to contact 347 of the sold-out relay switch 344 in product supply means 300. Contact 602*k* is coupled with conductor 5603 leading, as above-mentioned, to the rotatable contact element 506 of switch section 502 of homing means 500. Contact 602*l* is coupled with conductor 1602 and an interconnected conductor 6702 which respectively lead to the normally closed contact 115 of vend switch 113 in coin handling means 100 and a portion of cup supplying means 700 later to be described.

*Mechanical construction of homing means and credit means*

Reference is now made to Figures 6–11 inclusive, wherein is illustrated the mechanical construction of an improved form of switching structure generally designated 900 utilized in the preferred embodiment of the machine 10 to provide the components required by the homing means 500 and the credit means 600. Switching structure 900 includes a base 901 upon which are mounted a homing switch functioning solenoid generally designated 902 (corresponding to the solenoid 516 in Figure 5–C), and a credit switch functioning solenoid generally designated 903 (corresponding to the solenoid 616 in Figure 5–C).

A block 904 having a upstanding pivot post 905 thereon is adjustably mounted on base 901 by means of a bracket 906 and an adjusting screw 907. A frame assembly generally designated 908 for supporting various working parts of the structure 900 is mounted on the base 901 between the solenoids 902 and 903 and the block 904.

Solenoid 902 includes means 909 coupled with the reciprocable armature thereof and extending therefrom to a point of suitable connection as by a pin 910 with one end of a rod 911 reciprocably mounted in frame structure 908 and extending through the latter to a point preferably somewhat beyond the pivot post 905 of block 904. In similar fashion, solenoid 903 is provided with an armature extension 912 coupled as by pin 913 with a rod 914 reciprocably mounted in frame 908 and extending therethrough coextensively with rod 911. A retarding member 915 rests in rockable fashion against the side of post 905 remote from solenoids 902 and 903 and extends in both directions from post 905 to points of slidable coupling with rods 911 and 914, it being apparent from Figures 9, 10 and 11 that the member 915 is provided with an opening 916 adjacent each end thereof through which the rods 911 and 914 freely pass. A coil spring 917 is provided on rod 911 between the member 915 and the end of rod 911 remote from solenoid 902, there being a spring confining ring 918 adjacent the end of rod 911 in opposite engagement with the spring 917. Similarly, rod 914 is provided with a spring 919 and a retaining ring 920, such spring 919 being confined between ring 920 and members 915.

It will be understood that rods 911 and 914 are respectively adapted to reciprocate toward the solenoids 902 and 903 when the latter are energized. It will be further understood that the rod 911 is provided for actuating the homing switch means 500 and the rod 914 is provided for actuating the credit switch means 600 in a manner to be hereinafter further detailed.

In certain types of equipment, of which the vending machine 10 under consideration is exemplary, it is desirable to provide interlocking means between two switching structures by which it may be assured that same may operate alternately but not simultaneously. Such is the function of the rockable member 915 and the springs 917 and 919, it being understood that the block 904 will be adjusted by screw means 907 such that upon energization of the corresponding solenoid 902 or 903 either of rods 911 or 914 may be fully reciprocated toward its corresponding solenoids. During such reciprocation either of the rods 911 or 914 must overcome the yieldable retarding force of both of the springs 917 and 919 by virtue of the operable interconnection effected by the rockable retarding member 915. The result achieved by the construction described, is that whichever of solenoids 902 or 903 is energized even slightly before the other will complete the reciprocation stroke of its corresponding rod 911 or 914, and the other will be prevented from reciprocating its rod 911 or 914 until the first energized solenoid has been deenergized.

It may be observed even at this point that the construction described accomplishes a desirable and many times necessary function in an extremely simple, reliable and economical fashion, whereas the prior art would conventionally have relied upon expensive and relatively less reliable electrical interlocks greatly complicating the electrical circuitry involved.

Extending across and mounted upon the frame assembly 908 is a shaft 921. Referring particularly to Figures 6 and 9, it will be seen that there is rotatably mounted upon the shaft 921 above each of the reciprocable rods 911 and 914 a driving ratchet element generally designated 922 having a bearing sleeve portion 923, a laterally toothed ratchet portion 924 and a depending bifurcated crank portion 925 provided with a downwardly facing notch 926 at the lower extremity thereof. Received within the notch 926 of each of driven ratchet members 922 is a pin 927 extending laterally from the corresponding rod 911 or 914. Thus, each time that the rod 911 or 914 is reciprocated in the direction of its corresponding solenoid 902 or 903, it will be seen that the corresponding crank 925 will be swung to rotate the corresponding driven ratchet 922 and its toothed portion 924 in the same direction as the slope of a tooth 928 thereon, it being noted that only one or a few teeth 928 are preferably provided in order to reduce frictional resistance.

Rotatably mounted on the shaft 921 adjacent each of the driving ratchets 922 is a driven ratchet generally designated 929 and extending through a plate 930 (or 931, as the case may be) forming a part of the frame assembly 908. Each driven ratchet 929 includes a portion 931 with similarly directed teeth on each side thereof, the teeth on one side of same being cooperable with the teeth 928 of the corresponding driving ratchet 922, and the teeth on the other side thereof being engagable by a stop lug 932 bent from adjacent plate 930 (or 931) for preventing retrograde movement of the driven ratchet 929.

The remaining portions of driven ratchets 929 comprise switch element carrying bearing portions 933 and 934 in the case of the homing and credit portions of the switch structure 900 respectively, such bearing portions 933 and 944 respectively extending through the plates 930 and 931 and both being rotatable upon the shaft 921.

It will now be apparent that, upon energization of the solenoid 902, the rod 911 will be reciprocated theretoward against the yieldable action of springs 917 and 919 (both of which will be substantially fully compressed during full reciprocation of rod 911). Such reciprocation of rod 911 shifts the crank 925 to rotate the driving cam 922 in a direction suitable for slippage of its teeth 928 over the proximate teeth of the driven ratchet 931. Driving ratchet 922 is mounted for reciprocation, as well as rotation, upon the shaft 921 and a yieldable leaf spring 935 normally biases the same into engagement with the driven ratchet 929 but permits slight reciprocation away from the latter for slippage of teeth 928 during initial reciprocation of rod 911 when solenoid 902 is energized. Since lug 932 is holding the driven ratchet 929 against rotation, it will be obvious that the driving ratchet 922 is advanced to a cocked position from which it may rotate the driven ratchet 929 a predetermined amount upon deenergization of solenoid 902 and return of rod 911 to its normal position under the action of springs 917 and 919. Thus, the structure described serves to cock the driving ratchet 922 upon each energization of the solenoid 902 and to advance both the driving ratchet 922 and the switch element bearing driven ratchet 929 upon deenergization of the solenoid 902. Solenoid 903 and its associated structure obviously functions in the same manner to advance the switch element carrying portion 934 of the corresponding driven ratchet 929.

Stationarily mounted between the plates 930 and 931 of frame assembly 908 by bolts 936 and spacers 937 are three annular discs 938, 939 and 940 formed of insulating material. Discs 938 and 939 are disposed to circumscribe portions of the sleeve portion 933 of the homing switch ratchet 929, while disc 940 is disposed to circumscribe a portion of the sleeve 934 of credit switch ratchet 929. Obviously, greater or lesser numbers or differing arrangements of discs 938, 939 and 940 could be provided for other applications of the switch structure 900, and it will further be understood that the contact structure upon the discs 938, 939 and 940 can likewise be varied to meet the needs of a particular application. In the illustrated embodiment, however, the disc 938 carries on each side thereof sets of stationary wiper contacts respectively designated 941 and 942. Such sets of stationary contacts 941 and 942 are held on discs 938 by any suitable means such as plastic rivets 943 of insulating material, and it will be understood that such sets of contacts 941 and 942 correspond in the illustrated embodiment to the stationary contacts of the homing switch sections 503 and 504, whose electrical aspects are shown in Figure 5–C.

The switch element carrying portion 933 of homing ratchet 929 is flattened as at 944 to receive thereon an annular member 945 rotatable therewith. Affixed to the opposite sides of member 945 are conductive metallic contact elements 946 and 947 which correspond to the rotatable contact elements 507 and 508 of homing switch sections 503 and 504 respectively. The inner end portions of the stationary contacts 941 and 942 extend over and into wiping engagement with the corresponding rotatable contact elements 946 and 947 at those zones of the latter where protuberances or poles such as 512, 513, 514 and 515 in Figure 5–C are located. Between, for instance, the poles 512 and 513, it will be understood that the rotatable contact element 946 is cut back around its outer periphery so that no engagement is thereat made between the same and an adjacent stationary contact 941. The manner of shaping and forming such contact elements as 946 and 947 is of itself conventional in the art and need not be further detailed. The electrical interconnection indicated by the numerals 559 and 560 in Figure 5–C between rotatable contact elements 946 and 947 may be accomplished by a direct connection thereof by means of a conductive rivet 948 or, if desired, a thirteenth pair of stationary contacts 941 and 942 may extend inwardly sufficiently to continuously engage the contact elements 946 and 947 and interconnected by a conductor external to the switching structure 900 or by a conductive rivet (not shown) interconnecting such thirteenth pair of stationary contacts 941 and 942.

The construction of the switching elements associated with the disc 939 may be similar to that just described, except that, since Figure 5–C will reveal that the stationary contacts at corresponding positions of homing switch sections 501 and 502 are to be electrically interconnected, only one set 942′ of the pair of sets of stationary wiper elements need be provided with connection lugs extending externally from the disc 939, since the other set of wipers may be electrically commoned by means of conductive rivets 949.

The credit switch disc 940 may be of construction exactly similar to that described for the homing switch disc 938 except for the obviously different configuration to be used in connection with the rotatable contact elements 946 and 947 to provide the appropriate number of protuberances or poles thereon.

Associated with the rod 911 is an auxiliary, interrupting switch assembly 950 having a toggle element 951 adapted to extend into an opening 952 in a cam plate 953 reciprocably mounted in the frame assembly 908 and adapted to be reciprocated by contact with an upper bifurcated portion 954 thereof with a laterally extending pin 955 disposed upon the reciprocating rod 911. Toggle member 951 is operably coupled as by a spring 956 with a swingably mounted pole piece 957 adapted to normally engage a stationary contact 958 but to be moved out of engagement with the latter when rod 911 is reciprocated toward solenoid 902 during energization of the latter. In the construction shown for illustration, an opposed, normally open contact 959 is also provided, although same is not utilized in the machine 10.

An interrupting switch assembly 960 essentially similar to that described for assembly 950 is provided in association with rod 914 and is toggled by means of a reciprocable cam 961 driven by a pin 962 extending laterally from the rod 914.

It will thus be apparent that the switch structure 900 described is not only compact, reliable and simple to construct, but is thereby rendered extremely economical to manufacture and desirable for use in applications where the mentioned features are of importance.

*Cup supplying means*

Attention is now directed to that portion of Figure 5–D relating to the cup supplying means 700. It will be understood that the mechanical aspects of cup supplying means 700 may take various forms, a number of which are available commercially. Insofar as the present invention is concerned, however, consideration may be limited primarily to the electrical aspects of such structure.

Cup supplying means 700 includes a cup dropper operating motor 701 adapted to release a single cup 23 into vending position on the platform 78 each time motor 701 is energized. Associated with motor 701, however, are four cam operated, sequenced switches 702, 703, 704 and 705 adapted for operation by motor 701 during each operational cycle thereof.

Switch 702 is a cup dropper motor timer switch for holding motor 701 energized during a complete cycle of operation thereof; it has a pole piece 706 normally in engagement with a contact 707 but shiftable into engagement with a contact 708.

Switch 703 is a double sugar dispensing control switch; it has a pole piece 709 normally in engagement with a contact 710 but shiftable into engagement with a contact 711.

Switch 704 is a normally open, single pole, single throw switch for controlling the dispensing time for hot chocolate preparing water to deliver a measured quantity thereof to the cup 23.

Switch 705 is a normally open, single pole, single throw switch for controlling the dispensing time for coffee to deliver a measured quantity thereof to the cup 23.

Also forming a part of cup supplying means 700 are an anti-jackpot switch 712, which operates only when a cup 23 has been properly dispensed and delivered to a vending position upon platform 78, and a normally open, single pole, single throw, cup empty indicating switch 713, which closes only when the supply of cups has been exhausted from cup supplying means 700. Anti-jackpot switch 712 has a pole piece 714 normally in engagement with a contact 715 but shiftable into engagement with a contact 716.

Also shown in Figure 5–D because of its usual physical disposition, but actually forming a part of servicing control means 400 from the functional point of view is a manually operable cup dumping switch 418 having a pole piece 419 normally in engagement with a contact 420 but shiftable into engagement with a contact 421.

One side of cup dropper motor 701 is coupled by a conductor 751 with power line 95, and the other side of motor 701 is coupled by conductors 752 and 753 with contact 708 of motor switch 702, by conductors 752 and 7401 with contact 421 of manual cup dumping switch 418, and by conductor 752 with a conductor 6701 leading to contact 602*i* of credit switch section 602 in credit means 600.

Contact 707 of cup motor switch 702 is coupled with a conductor 3703 leading to product supply means 300 and contact 601*c* of credit switch section 601. Pole piece 706 is coupled with conductor 6702 leading to contact 602*l* of credit switch section 602 and, through continuation 1602, to contact 115 of vend switch 113 in coin handling means 100.

Contact 710 of double sugar switch 703 is coupled by a conductor 754 with contact 715 of anti-jackpot switch 712. Pole piece 709 of double sugar switch 703 is coupled by conductors 7801 and 7802 with a sugar dispensing switch later to be described in vending means 800 and by conductors 7801 and 7803 with a chocolate powder dispensing switch also in vending means 800 and to be discussed in connection therewith. Contact 711 of double sugar switch 703 is coupled with a conductor 5703 leading to contact 503*k* of homing switch section 503.

Chocolate pour switch 704 is coupled between a conductor 3704 leading to the chocolate count relay 350 in product supply means 300 and the conductor 5702 leading to contact 503*f* of homing switch section 503 in homing means 500.

Coffee pour switch 705 is coupled between the conductor 5701 leading to contacts 503*a* through 503*e* inclusive of homing switch section 503 in homing means 500 and a conductor 7804 leading through conductor 7805 to one side of the coffee dispensing solenoid to be described in connection with vending means 800 and through conductor 4802 with one side of the manual coffee dump switch 416 forming a part of servicing control means 400.

Pole piece 714 of anti-jackpot switch 712 is coupled through conductive means 755 and 756 with contact 420 of the cup dumping switch 418, and through conductor 755 with a conductor 4801 leading to the other side of the manual coffee dumping switch 416 in servicing control means 400. Contact 716 of anti-jackpot switch 712 is coupled with a conductor 5704 leading to the rotatable contact elements 507 and 508 of homing switch sections 503 and 504 respectively in homing means 500.

Pole piece 419 of manual coffee dumping switch 418 is coupled with a conductor 3702 leading to normally closed contact 327 of waste tank switch 80 and other parts of product supply means 300.

One side of the cup empty switch is coupled by a conductor 757 with the power line 90, and the other side of switch 713 is coupled with a conductor 3701 leading to the normally open contact 328 of waste tank switch 80 and one side of the sold-out relay coil 343 in the product supply means 300.

It may be noted at this juncture that of the cam operated switches 702, 703, 704 and 705, operably associating with cup dropper 701, the motor switch 702 operates first to complete a holding circuit for cup dropper motor 701 and to break an energizing circuit for the credit switch solenoid 616 in credit means 600. Next, the chocolate pour switch 704 and coffee pour switch 705 then operate for respectively predetermined periods of time, with the double sugar switch 703 operating before chocolate pour switch 704 and coffee pour switch 705 have ceased to operate. Double sugar switch 703 then returns to normal condition followed by chocolate pour switch 704 and coffee pour switch 705, and finally, by motor holding switch 702, to complete the operational cycle of the cup dropper motor 701.

*Vending means*

Attention is now directed to that portion of Figure 5–D relating to the vending means 800. Means 800 include a sugar dispensing motor 801, a cream dispensing solenoid 802, a chocolate powder dispenser motor 803, a chocolate water dispensing solenoid 57 and a coffe dispensing solenoid 75. Associated with sugar dispensing motor 801 is a cam operated switch 806 adapted to permit continuance of energization of motor 801 during each cycle thereof for only a predetermined period of time selected to dispense a predetermined, single measure of sugar. Sugar dispensing switch 806 has a pole piece 807 normally in engagement with a contact 808 but shiftable into engagement with a contact 809.

Cream dispensing solenoid 802 controls a valve (not shown) or other suitable mechanism adapted to dispense a predetermined amount of cream upon each actuation of the solenoid 802.

Operably associated with the chocolate powder dispensing motor 803 is a cam operated switch 810 adapted to permit energization of motor 803 for only a predetermined period of time chosen to dispense a predetermined measure of chocolate powder. The chocolate powder switch 810 has a pole piece 811 normally in engagement with a contact 812 but shiftable into engagement with a contact 813.

The chocolate water controlling solenoid 57 and the coffee dispensing solenoid 75 are the same solenoids shown in Figure 3 as operably coupled respectively with valves 56 and 74.

One side of each of sugar dispensing motor 801, cream dispensing solenoid 802, chocolate powder dispensing motor 803, chocolate water dispensing solenoid 57 and coffee dispensing solenoid 75 is coupled with power line 95 by conductive means 851, 852, 853, 854 and 855 respectively.

The other side of the sugar dispensing motor 801 is coupled by conductive means 856 with pole piece 807 of sugar dispensing switch 806. Contact 808 of sugar dispensing switch 806 is coupled with a conductor 5802 leading to contacts 504*g*, 504*j*, 504*k*, and 504*l* of homing switch section 504 in homing means 500.

As above noted, contact 809 of sugar dispensing switch 806 is coupled through conductors 7802 and 7801 with pole piece 709 of double sugar switch 703 in cup supplying means 700.

The other side of cream dispensing solenoid 802 is coupled with a conductor 5801 leading to contacts 504*a*, 504*c*, 504*e* and 504*f* of homing switch section 504.

The other side of chocolate powder dispensing motor 803 is coupled by a conductor 857 with pole piece 811 of chocolate powder dispensing switch 810. Contact 812 of chocolate powder dispensing switch 810 is coupled with a conductor 4803 leading to contact 414 of manual clean-up switch 412 in servicing control means 400, to chocolate counter device 350 and, through conductor 3704 to one side of chocolate pour switch 704 in cup supplying means 700.

As above noted, contact 813 of chocolate powder dispensing switch 810 is coupled through conductors 7803 and 7801 with pole piece 709 of double sugar switch 703 in cup supplying means 700.

The other side of chocolate water dispensing solenoid 57 is coupled with a conductor 3801 leading to contact 308 of in switch 305 in product supply means 300. The other side of coffee dispensing solenoid 75 is, as above noted, coupled through a conductor 7805 and a conductor 7804 with one side of coffee pour switch 705 in cup supplying means 700 and through conductor 4802 with one side of manual dump switch 416 in servicing control means 400.

NORMAL OPERATION

Assume that the machine 10 is in normal stand-by condition with adequate supplies of cups, change-making coins and all product materials therein, that the compartment 61 of reservoir is provided with a supply of brewed coffee therein automatically prepared as described hereinabove, that waste tank 41 is substantially empty, and that power lines 90 and 95 are connected with a source of electrical power.

All of the limited operation or out of operation indicating lamps 201, 202 and 203 will be deenergized, all of the coin deposit inhibiting solenoids 139, 140 and 141 are energized to permit coinage deposit, and all control switches will be in the positions illustrated, with the exception of hot water temperature sensing switch 356, which will normally be closed. Manipulation of any of the product selection switches 204, 208, 212, 216, 220 or 224 at this time will have no functional effect whatsoever upon any part of the machine 10 other than the push buttons which may be physically shifted.

Upon deposit by a customer of adequate coinage consisting of two nickels, a dime or a quarter into the corresponding coin chute 105, 111 or 112 the vend switch 113 will be momentarily operated during the passage of a coin through chute 109. Also, if a quarter was deposited, coin handling means 100 will deliver to the customer three nickels 121 in change, in the manner above described.

Operation of vend switch 113 completes an energizing circuit for credit switch solenoid 616 traceable from power line 90 through structures 151, 114, 115, 1603, 601*a*, 605, 606, 601*d*, 652, 616 and 651 to power line 95.

Cessation of the momentary operation of vend switch 113 deenergizes credit switch solenoid 616 to move rotary elements 603 and 604 one step in a clockwise direction as shown in Figure 5–C. Such stepping of rotary credit switch elements 603 and 604 to their second position breaks the formerly existing energizing circuit for coin deposit inhibiting solenoids 139, 140 and 141 traceable from power line 90 through structures 151, 114, 115, 1602, 6702, 706, 707, 3703, 384, 383, 353, 354, 2301, 225, 227, 2305, 346, 347, 3601, 602*j*, 609, 2601, 1601, 169 (and 168, 167 and 166), 141 (and 139 and 140), and 165 (and 163), to power line 95.

Assume the customer desires hot chocolate and, therefore, pushes the button to operate product selection switch 224. Operation of switch completes an energization circuit for homing switch solenoid 516 traceable from power line 90 through structures 151, 114, 115, 1602, 6702, 706, 707, 3703, 384, 383, 353, 354, 2301, 225, 226, 2506, 557, 502*f*, 511, 5603, 602*k*, 612, 611, 602*h*, 618, 617, 5601, 517, 552, 516 and 551 to power line 95.

Since interrupter switch 517 is opened upon completion of each power stroke of homing solenoid 516, solenoid 516 is deenergized to step rotary switch elements 505, 506, 507 and 508 one step on the return stroke, and since interrupter switch 517 recloses during each such return stroke of homing solenoid 516, it will be clear that the homing solenoid 516 will continue to recycle itself to successively step the rotary switch elements 505, 506, 507 and 508 until element 506 reaches a position where one of its poles 511 are engaging the stationary contact of homing switch section 501 which is energized by the customer's product selection input 1914 (contact 502*f*) corresponding to hot chocolate, in the example under consideration. Upon the homing of solenoid 516 to the mentioned position, its energizing circuit is broken between poles 511 and the energized contact 502*f*, so that the stepping action of the solenoid 516 stops.

Since all of the homing switch rotary elements 505, 506, 507 and 508 are ganged to rotate together, it will be apparent that when the element 506 of homing switch section 502 has been homed to a position where none of its poles 511 engage the energized contact 502*f* (which will be after five stepping cycles of the homing solenoid 516), it will be apparent that pole 509 of rotary switching element 505 of homing switch section 501 will be engaging contact 501*f*, that pole 512 of rotary switching element 507 of homing switch section 503 will be engaging contact 503*f*, that pole 514 of rotary switching element 508 of homing switch section 504 will be engaging contact 504*f*, and that pole 515 of element 508 will be engaging contact 504*l* of homing switch section 504.

The engagement of pole 509 of switching element 505 of homing switch section 501 with contact 501*f* of the latter completes an energizing circuit for the credit stepping solenoid 616 traceable from power line 90 through structures 151, 114, 115, 1602, 6702, 706, 3703, 384, 383, 353, 354, 2301, 225, 226, 2506, 557, 501*f*, 509, 5602, 601*b*, 605 (in its second position), 606, 652, 616 and 651 to power line 95.

It may be noted that the operations of homing means 500 and credit means 600 heretofore described occur in almost instantaneous sequence and with such rapid action that same are normally completed before the customer has ceased to operate the product selection switch 224. Should the product selection switch 224 be released before completion of the homing cycle of homing means 500, the operation will simply be interrupted but machine 10 will take no further action until the product selection switch has been reoperated by the purchaser. In view of the described nature and construction of the switching structure 900 used for the homing means 500 and the credit means 600, however, it is extremely unlikely that such situation could ever arise in the preferred embodiment of machine 10.

The last mentioned energization of credit switching solenoid 616 serves to advance the rotary switching elements 603 and 604 of the credit switch sections 601 and 602 to their third position as soon as the customer releases the product selection switch 224 to break the above traced circuit thereby deenergizing the credit switching solenoid 616 to effect the mentioned advancement of elements 603 and 604 on its return stroke.

Since elements 603 and 604 of credit switching sections 601 and 602 are ganged and rotate together, the advancement of same to their mentioned third position completes an energizing circuit for the cup dropper motor 701 traceable from power line 90 through structures 151, 114, 115, 1602, 6021, 612, 611, 602*i*, 6701, 752, 701 and 751 to power line 95. At the same time, the credit switching solenoid 616 is traceable the same as above to conductor 1602, thence through structures 6702, 706, 707,

3703, 3602, 601*c*, 605, 606, 601*f*, 652, 616 and 651 to power line 95.

Energization of cup dropper motor 701 first operates switch 702 to break the energizing circuit for credit stepping solenoid 616, thereby restoring the rotary switching element 603 and 705 to a fourth position which, by virtue of their construction, is the equivalent of their initial stand-by positions, except that each of the poles 605, et seq. has been rotated clockwise through an arc of 90°.

Operation of the cup unit timer motor 702 simultaneously completes a time controlled holding circuit for the energization of motor 701 traceable from power line 90 through structures 151, 114, 115, 1602, 6702, 706, 708, 753, 752, 701 and 751 to power line 95. As cup dropper motor 701 continues to operate under the control of its timing switch 702, the chocolate pour switch 704, which also operates in a time controlled manner, is operated and a cup 23 dispensed through the action of motor 701 reaches a position on platform 78 which operates the anti-jackpot switch 712. It may be noted, although not pertinent to the instant example, that the timed coffee pour switch 705 is also operated along with chocolate pour timing switch 704.

The operation of chocolate pour switch 704 and anti-jackpot switch 712 completes energizing circuits for the cream dispensing solenoid 802, the sugar dispensing motor 801, the hot chocolate powder dispensing motor 803, the main water valve solenoid 48, and the hot chocolate preparing water valve solenoid 57. These circuits may be traced as follows: For the sugar dispensing motor 801 from power line 90 through structures 374, 375, 326, 327, 371, 3702, 419, 420, 756, 755, 714, 716, 5702, 560, 515, 504*l*, 562, 5802, 808, 807, 856, 801 and 851 to power line 95. For the cream dispensing solenoid 802, from the power line 90 as above, to conductor 560 thence through structures 514, 504*f*, 5801, 802 and 852 to power line 95. For chocolate powder dispensing motor 803, from power line 90 as traced above to conductor 5704 thence through structures 559, 512, 503*f*, 5702, 704, 3704, 3403, 4803, 812, 811, 857, 803 and 853 to power line 95. For main water valve solenoid 48 as just above traced for motor 803 to the conductor 3704 thence through structures 3403, 414, 412, 3401, 356, 358, 308, 307, 359, 48 and 357 to power line 95. For the chocolate preparing water valve solenoid 57, the same as immediately above traced for main water valve solenoid 48 to conductor 3401 thence through structures 3801, 57 and 854 to power line 95.

After suitable portions of sugar and chocolate powder have been dispensed by the action of motors 801 and 803 respectively, the switches 806 and 810 respectively associated therewith operate to cut off the motors 801 and 803. The motor 701 then opens chocolate pour timer switch 704, which breaks the deenergizing circuits for the main water valve solenoid 48 and the chocolate preparing water valve solenoid 57. Cup motor timer switch 702 then is returned to normal by its cam to deenergize the cup dropper motor 701 and leave all of the switches 702, 703, 704 and 705 associated therewith in their normal stand-by conditions. The return of anti-jackpot switch 712 to its normal condition upon removal of the cup 23 containing the vended hot chocolate, which has been mixed in mixing bowl 36 and delivered to cup 23 through spout 37, completes energizing circuits for the sugar dispenser motor 801 and the chocolate powder dispensing motor 803 so that such motors 801 and 803 can complete their respective cycles of operation and restore their cam controlled switches 806 and 810 respectively to normal stand-by condition. Such energizing circuits for cycle completion action of motors 801 and 803 is traceable from power line 90 through structures 374, 376, 326, 327, 371, 3702, 419, 420, 756, 755, 714, 715, 754, 710, 709, 7801, 7802 (or 7803), 809 (or 813), 807 (or 811), 856 (or 857), 801 (or 803), and 851 (or 853) to power line 95.

It may be noted that interrupter switch 617 associated with the credit means 600 serves as an electrical interlock to prevent simultaneous energization of both the credit switching stepper solenoid 616 and the homing switch stepper solenoid 516, which might otherwise occur in the event that two product selection switches were operated simultaneously.

It will be understood that the operation of the control mechanism of the machine 10 when a product selection switch corresponding to one of the available varieties of coffee products is operated will be comparable in virtually every way to the mode of operation above discussed for hot chocolate. Naturally, however, the rotary switching elements 505, 506, 507 and 508 of the homing switch sections 501, 502, 503 and 504 will home or come to rest at a different position depending upon the particular product selection switch operated. Depending upon such homed position of the switch sections 501, 502, 503 and 504, different ones or combinations of the sugar dispensing motor 801, the cream dispensing solenoid 802 and the coffee dispensing solenoid 75 will be operated. It may be noted that the stationary switch contacts 503*a* through 503*e* inclusive are all effective for energizing the coffee dispensing solenoid 75, while the various combinations of stationary contacts on homing switch section 504 provide for different combinations of cream and sugar. It may also be observed that the coffee pour switch 705, like the chocolate pour switch 704, is operated by the motor 701 for only a predetermined time appropriate for vending a desired amount of product into the cup 23. Finally, with regard to the operation of the machine 10 in vending coffee, it should be pointed out that the double sugar controlling switch 704 is operated for an interval overlapping in time the normal operation of sugar dispensing switch 806 controlled by the sugar dispensing motor 801, so that another measure of sugar may be dispensed by motor 801 before the switch 704 associated with motor 701 is restored to its normal condition.

It will now be observed that machine 10 is adapted for accomplishnig all of the above-mentioned and other advantageous objects thereof. Since it will be apparent to those skilled in the art that various facets of the invention will have applicability in uses other than the preferred embodiment of machine 10 disclosed for purposes of illustration, it should be understood that the invention should be deemed as limited only by the scope of the claims.

Having thus described the invention, what is claimed as new and desired to be secured by Letters Patent is:

1. In a vending machine, the combination of: product supply means for providing a source of any of a plurality of product materials; vending means operably coupled with said product supply means and including a number of electrically responsive devices for dispensing corresponding of said product materials; coin handling means for receiving deposited coinage and including electrical switching apparatus arranged for actuation by said deposited coinage; credit means including shiftable electrical switching structure having normal and operated positions, and electrically responsive means operably coupled with the structure for shifting the same; homing means including rotatably shiftable electrical switching mechanism having a normal position and more than one successive switching positions, and electrically responsive means operably coupled with the mechanism for shifting the same; electrical circuit means coupled with said apparatus and the electrically responsive means of said credit means for shifting said structure when said apparatus is actuated; a plurality of product selection switches; electrical circuit means coupled with said switches, said structure and the electrically responsive means of said homing means for shifting the mechanism to a predetermined switching position responsive to operation of any of said switches and corresponding to the operated switch after said structure has been shifted away from its normal position; and electrical circuit means coupled with said mechanism and said devices for actuating at least one device to dispense a quantity of the product material corresponding to the particular position to which said mechanism is shifted.

2. In a machine as set forth in claim 1, wherein is provided means operably coupled with said structure and said mehcanism for automatically restoring the same to the normal position thereof after actuation of said one device.

3. In a machine as set forth in claim 1, wherein is provided means for dispensing a product receptacle, and electrical circuit means coupled with said structure and with said receptacle dispensing means for actuating the latter.

4. In a machine as set forth in claim 1, wherein said product supply means includes means for preparing and storing a quantity of commodity formed by combination of certain of said materials, and means for automatically recycling said preparing means for maintaining a quantity of said commodity in stored condition.

5. In a machine as set forth in claim 1, wherein said coin handling means includes means operably coupled with said structure for inhibiting the deposit of coinage in the coin handling means while said structure is in shifted condition.

6. In a machine as set forth in claim 1, wherein said structure and said mechanism comprise disc-type rotary switches, there being a pair of solenoids each having a shiftable armature and ratchet means operably coupling each of the armatures with certain of said switches, there being yieldable means mechanically coupling the armatures for preventing simultaneous shifting thereof.

7. In electrical switching apparatus, a base; a pair of solenoids on the base and having armatures adapted to reciprocate along substantially parallel paths; means mechanically coupling the armatures to prevent simultaneous reciprocation thereof in the same direction; a plurality of disc-type rotary switches on the base each having a stationary portion and a rotatable portion; and ratchet means for each solenoid respectively operably coupling the same with certain of said rotatable portions.

8. In switching apparatus as set forth in claim 7, wherein said coupling means includes pivot structure between the axes of reciprocation of said armatures, a member operably associated intermediate a pair of its extremities with said structure for rocking movement relative to the latter, and a mechanism adjacent each of said pair of extremities respectively linking the same with a corresponding of said armatures, said armatures, structure, member and linking mechanisms being so arranged that only one of said armatures may be fully reciprocated in said direction at a given time.

9. In switching apparatus as set forth in claim 8, wherein said member is rigid, and said mechanisms are yieldable.

10. In switching apparatus as set forth in claim 9, wherein said mechanisms each comprises a compression spring bearing against a portion of the corresponding armature, extending from the latter in said direction, and oppositely bearing against the member adjacent a corresponding of said extremities of the latter.

11. In switching apparatus as set forth in claim 8, wherein said ratchet means each includes a driven ratchet secured to certain of said rotatable portions of said switches and provided with a disc-like portion having opposite faces, each of which faces is provided with an annular series of teeth thereon, means on the base engageable with the teeth on one face of the driven ratchet for preventing rotation of the latter in one direction, a driving ratchet mounted on the base for reciprocatory movement toward and away from the driven ratchet and for rotation upon the same axis as the latter, said driving ratchet having a tooth thereon engageable with the teeth on the opposite face of the driven ratchet when the driving ratchet is fully reciprocated toward the driven ratchet, said driving ratchet being operably coupled with the corresponding armature for oscillatory rotative movement by the latter, and spring means yieldably biasing the driving ratchet along its reciprocatory path of travel toward the driven ratchet.

12. In a vending machine, the combination of: product supply means adapted, when stocked, for providing a source of any of a plurality of product materials; vending means operably coupled with said product supply means and including a number of electrically responsive devices adapted, when actuated, for dispensing corresponding of said product materials; coin handling means adapted to receive deposited coinage and including electrical switching apparatus adapted for actuation by said deposited coinage, said apparatus including switching means adapted to be momentarily actuated by the deposit of said coinage; credit means including electrical switching structure having stationary contact parts and shiftable contact parts adapted to be shifted relative to said stationary parts thereof successively from an original position through a number of successive intermediate positions and then in effect back to said original position, and electrically responsive means operably coupled with said shiftable parts of the structure for advancing the latter one position thereof each time said electrically responsive operating means for said structure is actuated; homing means including electrical switching mechanism having stationary contact parts and shiftable contact parts adapted to be shifted relative to said stationary parts thereof successively from any given position through a number of successive intermediate positions and then in effect back to said given position, and electrically responsive means operably coupled with said shiftable parts of the mechanism for advancing the latter one position thereof each time said electrically responsive operating means for said mechanism is actuated; a plurality of product selection switches; first electrical circuit means coupled with said switching means and the electrically responsive means of said credit means for actuating the latter for advancing the shiftable parts of said structure from said original to a first intermediate position thereof responsive to actuation of said switching means; second electrical circuit means coupled with said product selection switches, said structure and the electrically responsive means of said homing means for actuating the latter for advancing the shiftable parts of said mechanism to a particular position thereof corresponding to a particular product selection switch responsive to operation of said particular product selection switch after said shifting of the shiftable parts of said structure to said first intermediate position thereof; and third electrical circuit means coupled with said mechanism and the devices of said vending means for actuating at least one of said devices corresponding to said particular position of the shiftable parts of said mechanism responsive to advancement of the latter to said particular position thereof.

13. In a machine as set forth in claim 12, wherein said coin handling means includes electrically responsive means having energized and deenergized conditions in one of which deposit of coinage into said coin handling means is permitted and in the other of which such deposit of coinage is prevented, and there is provided fourth electrical circuit means coupled with said electrically responsive means of said coin handling means and with said structure and arranged for maintaining said last-mentioned electrically responsive means in said one condition thereof when the shiftable parts of said structure are in said original position thereof and for maintaining said last-mentioned electrically responsive means in said other condition thereof when the shiftable parts of said structure are in said intermediate positions thereof.

14. In a machine as set forth in claim 12, wherein said switching means of said apparatus includes a normally open portion adapted to be momentarily closed by the deposit of said coinage, said electrically responsive means of said credit means includes shiftable means adapted to be cocked when energized and operably coupled with the shiftable parts of said structure for advancing the latter one position upon subsequent deenergization of said last-mentioned electrically responsive means, and said first electrical circuit means couples said normally open portion of said switching means with said electrically responsive means of said credit means.

15. In a machine as set forth in claim 12, wherein said electrically responsive means of said homing means includes shiftable means adapted to be cocked when energized and operably coupled with the shiftable parts of said mechanism for advancing the latter one position upon subsequent deenergization of said last-mentioned electrically responsive means, and a normally closed, circuit interrupting switch electrically coupled in series with the electrically responsive means of said homing means in said second circuit means and operably coupled with said shiftable means for opening by the latter when said shiftable means is fully cocked.

16. In a machine as set forth in claim 15, wherein said mechanism is electrically coupled in series with the electrically responsive means of said homing means in said second circuit means.

17. In a machine as set forth in claim 16, wherein said switching means of said apparatus includes a normally open portion adapted to be momentarily closed by the deposit of said coinage, said electrically responsive means of said credit means includes shiftable means adapted to be cocked when energized and operably coupled with the shiftable parts of said structure for advancing the latter one position upon subsequent deenergization of said last-mentioned electrically responsive means, and said first electrical circuit means couples said normally open portion of said switching means with said electrically responsive means of said credit means.

18. In a vending machine, the combination of: coin handling means adapted to receive deposited coinage and including electrical switching apparatus adapted for actuation by deposited coinage, said apparatus including normally open switching means adapted to be mementarily closed by the deposit of said coinage; credit means including electrical switching structure having stationary contact parts and rotatable contact parts including a pole assembly adapted to be shifted relative to said stationary parts successively from an original position in which said assembly contacts a first at least one of said stationary parts, through a number of successive intermediate positions in which said assembly contacts the remainder of said stationary parts, and then in effect back to said original position in which said assembly again contacts said first at least one of said stationary parts, and electrically responsive ratchet means operably coupled with said rotatable parts for advancing the latter one position thereof each time said ratchet means is deenergized subsequent to previous energization thereof; homing means including electrical switching mechanism having stationary contact parts and rotatable contact parts including a pole assembly adapted to be shifted relative to said last-mentioned stationary parts successively from any given position thereof in which said last-mentioned assembly contacts all except one of a certain group of said last-mentioned stationary parts, through a number of successive intermediate positions in which said last-mentioned assembly contacts all except successive others of said group of stationary parts, and then in effect back to said given position in which said last-mentioned assembly again contacts all except said one of said group of stationary parts, electrical responsive ratchet means operably coupled with said last-mentioned rotatable parts for advancing the latter one position thereof each time said last-mentioned ratchet means is deenergized subsequent to previous energization thereof, and a normally closed interrupter switch operably coupled with said last-mentioned ratchet means for opening responsive to an operative energization of the latter and reclosing upon a subsequent operative deenergization of the latter; a plurality of normally open product selection switches; first electrical circuit means coupling said normally open switching means of said coin handling means with the ratchet means of said credit means for energizing the latter during momentary closing of said last-mentioned switching means upon deposit of coinage; and second electrical circuit means coupling said product selection switches with said group of stationary parts of said mechanism and coupling said assembly of said mechanism with said ratchet means of said homing means through said interrupter switch, the assembly of said structure and one of said remainder of stationary parts of said structure for repeatedly energizing and deenergizing said ratchet means of said homing means until the assembly of said mechanism has advanced to a position contacting all of said group of stationary parts of said mechanism except that one of the latter which corresponds to an operated product selection switch.

19. In switching apparatus as set forth in claim 7, wherein said coupling means includes a fulcrum element on the base, a rocker member pivotally engaging said fulcrum element, and structures operably coupling each of said armatures with said rocker member at spaced zones of the latter.

20. In switching apparatus as set forth in claim 19, wherein said zones are on opposite sides of the point of engagement of said rocker member with said fulcrum element.

21. In switching apparatus as set forth in claim 19, wherein said structures comprise springs.

22. In switching apparatus as set forth in claim 7, wherein is provided a shaft on said base and all of said rotatable portions are supported upon said shaft for rotation about the same axis.

References Cited in the file of this patent

UNITED STATES PATENTS

| | | |
|---|---|---|
| 2,558,522 | Knapp | June 26, 1951 |
| 2,776,074 | St. Laurence | Jan. 1, 1957 |
| 2,830,528 | Arnett | Apr. 15, 1958 |
| 2,834,190 | Andrews | May 13, 1958 |
| 2,852,043 | Cooper | Sept. 16, 1958 |